US009846810B2

(12) United States Patent
Partis

(10) Patent No.: US 9,846,810 B2
(45) Date of Patent: Dec. 19, 2017

(54) METHOD, SYSTEM AND APPARATUS FOR TRACKING OBJECTS OF A SCENE

(71) Applicant: CANON KABUSHIKI KAISHA, Tokyo (JP)

(72) Inventor: Ashley John Partis, New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 363 days.

(21) Appl. No.: 14/264,668

(22) Filed: Apr. 29, 2014

(65) Prior Publication Data

US 2014/0321704 A1    Oct. 30, 2014

(30) Foreign Application Priority Data

Apr. 30, 2013    (AU) .................................. 2013205548

(51) Int. Cl.
*G06K 9/00* (2006.01)
*G06T 7/20* (2017.01)
(Continued)

(52) U.S. Cl.
CPC ..... *G06K 9/00771* (2013.01); *G06K 9/00778* (2013.01); *G06K 9/6296* (2013.01);
(Continued)

(58) Field of Classification Search
CPC ........... G06K 9/00771; G06K 9/00671; G06K 9/00214; G06K 9/00664; G06K 9/00369;
(Continued)

(56) References Cited

U.S. PATENT DOCUMENTS 5,062,056 A * 10/1991 Lo ........................ G01S 3/7865
235/411
6,295,367 B1    9/2001 Crabtree et al.
(Continued)

OTHER PUBLICATIONS

Jiang et al., Optimizing Multiple Object Tracking and Best View Video Synthesis, Oct. 2008 [retrieved Jul. 19, 2016], IEEE Transactions on Multimedia, vol. 10, Issue: 6, pp. 997-1012. Retrieved from the Internet: http://ieeexplore.ieee.org/xpls/abs_all.jsp?arnumber=4657452&tag=1.*
(Continued)

*Primary Examiner* — Andrew Moyer
*Assistant Examiner* — Dennis Rosario
(74) *Attorney, Agent, or Firm* — Canon USA, Inc. I.P. Division

(57) ABSTRACT

A method of tracking objects of a scene is disclosed. The method determines two or more tracks which have merged. Each track is associated with at least one of the objects and having a corresponding graph structure. Each graph structure comprising at least one node representing the corresponding track. A new node representing the merged tracks is created. The graph structures are added as children nodes of the new node to create a merged graph structure. A split between the objects associated with one of the tracks represented by the nodes of the merged graph structure is determined. Similarity between one or more of the nodes in the merged graph structure and foreground areas corresponding to split objects is determined. One of the nodes in the merged graph structure is selected based on the determined similarity. A new graph structure for tracking the objects is created, the new graph structure having the selected node at the root of the new graph structure.

24 Claims, 15 Drawing Sheets

(51) Int. Cl.
*G06K 9/62* (2006.01)
*G06K 9/32* (2006.01)

(52) U.S. Cl.
CPC ........ *G06T 7/20* (2013.01); *G06K 2009/3291* (2013.01); *G06T 2207/20072* (2013.01); *G06T 2207/30196* (2013.01); *G06T 2207/30241* (2013.01)

(58) Field of Classification Search
CPC ........ G06K 2009/3291; G06K 9/00778; G06T 2207/30232; G06T 2207/10016; G06T 7/277; G06T 7/246; G06T 7/20; G06T 7/292; A61B 5/1123; G06F 19/00; A63B 24/0062
See application file for complete search history.

(56) References Cited

U.S. PATENT DOCUMENTS

| | | | |
|---|---|---|---|
| 7,825,954 B2 | 11/2010 | Zhang et al. | |
| 8,149,278 B2 | 4/2012 | Wren et al. | |
| 8,547,437 B2* | 10/2013 | Buehler | G06K 9/00335 348/143 |
| 2004/0113933 A1 | 6/2004 | Guler | |
| 2010/0157089 A1* | 6/2010 | Pakulski | G06K 9/3241 348/222.1 |
| 2013/0148852 A1 | 6/2013 | Partis | |
| 2015/0104066 A1* | 4/2015 | Shellshear | G06K 9/00778 382/103 |

OTHER PUBLICATIONS

Gavrila et al., Shape-Based Pedestrian Detection and Tracking, Jun. 17-21, 2002 [retrieved Jul. 19, 2016], 2002 IEEE Intelligent Vehicle Symposium, vol. 1, pp. 8-14. Retrieved from the Internet: http://ieeexplore.ieee.org/xpls/abs_all.jsp?arnumber=1187920&tag=1.*

Bose, et al., "Multi-class object tracking algorithm that handles fragmentation and grouping", In Computer Vision and Pattern Recognition, (2007). CVPR '07. IEEE Conference on, Proceedings from Computer Vision and Pattern Recognition, 2007; IEEE: Jun. 2007; p. 1-8.

Nillius, et al., "Multi-Target Tracking—Linking Identities using Bayesian Network Inference", Computer Vision and Pattern Recognition, 2006 IEEE Computer Society Conference on. vol. 2 IEEE, 2006, pp. 1-8.

Wu, et al., "Efficient Track Linking Methods for Track Graphs Using Network-flow and Set-cover Techniques", Computer Vision and Pattern Recognition (CVPR), 2011 IEEE Conference on. IEEE, 2011, pp. 1-8.

* cited by examiner

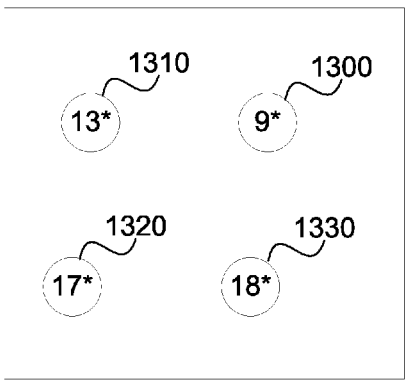
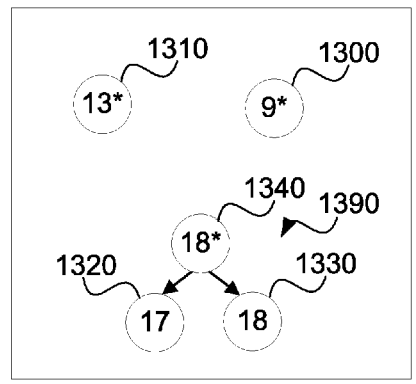
Fig. 14A    Fig. 14B
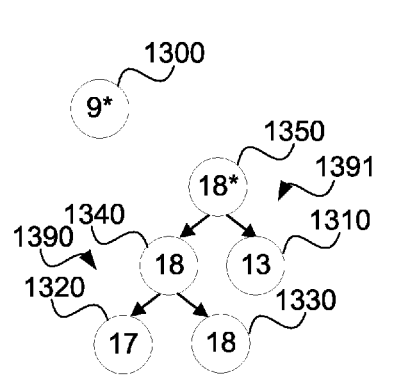
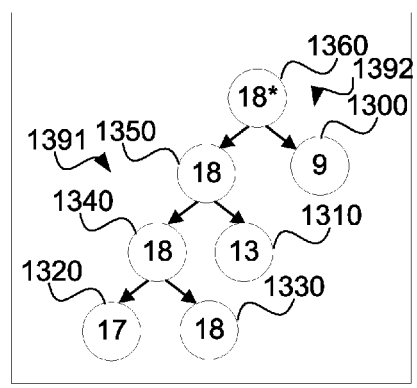
Fig. 14C    Fig. 14D
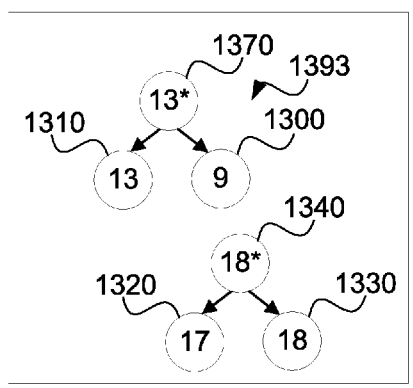
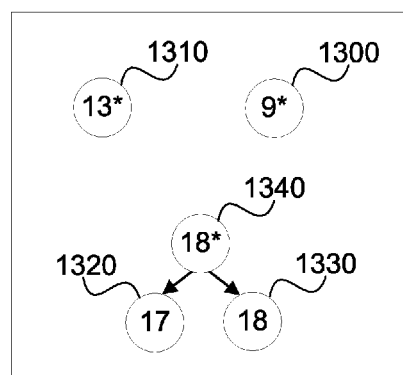
Fig. 14E    Fig. 14F

METHOD, SYSTEM AND APPARATUS FOR TRACKING OBJECTS OF A SCENE

REFERENCE TO RELATED PATENT APPLICATION(S)

This application claims the benefit under 35 U.S.C. §119 of the filing date of Australian Patent Application No. 2013205548, filed 30 Apr. 2013, hereby incorporated by reference in its entirety as if fully set forth herein.

TECHNICAL FIELD

The current invention relates to the tracking of objects in a sequence of images and, in particular, to a method and apparatus for tracking an object in the sequence of images. The current invention also relates to a computer program product including a computer readable medium having recorded thereon a computer program for tracking an object in a sequence of images.

BACKGROUND

Surveillance cameras, such as Pan-Tilt-Zoom (PTZ) network video cameras, are omnipresent nowadays. The cameras capture more data (video content) than human viewers can process. Automatic analysis of the captured video content is therefore needed.

An important part of automatic analysis of video content is the tracking of objects in a sequence of images captured of a scene. Objects may be separated from a background of the scene and treated as foreground objects by a previous extraction process, such as foreground/background separation. The terms foreground objects, and foreground, usually refer to moving objects, e.g. people in a scene. Remaining parts of the scene are considered to be background.

Foreground/background separation allows for analysis, such as detection of specific foreground objects, or tracking of moving objects within a sequence of images. Such further analysis has many applications, including, for example, automated video surveillance and statistics gathering, such as people counting.

One method of foreground/background separation is statistical scene modelling. In one example, a number of Gaussian distributions are maintained for each pixel of an image to model the recent history of the pixel. When a new input image of a sequence of images is received, each pixel from the image is evaluated against the Gaussian distributions maintained by the scene model at the corresponding pixel location. If the input pixel matches one of the Gaussian distributions, then the parameters of the associated Gaussian distribution are updated with an adaptive learning rate. Otherwise, a new Gaussian model for the pixel is created.

Foreground/background separation typically detects foreground areas of a scene as blobs, where each blob represents a foreground area of a scene. Blobs have no consistent identity within each subsequent image of an image sequence without a later step, such as a video object tracker, to resolve the identities of blobs over time.

Video object tracking provides a consistency across images of an image sequence for foreground blobs by associating blobs with each other across multiple images (i.e. over time).

The process of foreground/background separation to produce foreground blobs, which are also called detections, has an ambiguity over the relationship of a given blob to an object. Each blob may correspond to part of an object, to one object, or to more than one object. For example, one object may correspond to multiple foreground blobs. From the point of view of a video object tracker, a blob has no context with regard to real-world objects.

More than one blob may correspond to one object, potentially resulting in more than one track corresponding to one object. More than one track may correspond to one object where there have been partial detections due to detection failures in the foreground/background separation process.

One blob may also correspond to one object where a clear, unobstructed view of the object can be seen by a camera and there are no detection failures for the object.

One blob may correspond to more than one object where the objects are overlapping in the view of a camera. The overlapping objects may be said to exhibit spatial connectedness with regard to the foreground/background separation process, and more generally one of the objects may be said to be occluding one or more other objects.

As objects move through a scene, the objects can be viewed to be constantly interacting through merging and splitting of blobs. For example, two humans walking across the scene in opposite directions may cross. Initially, a foreground/background separation process may detect each human as a single blob (i.e., there will be two blobs detected). When the humans cross (i.e., the humans exhibit spatial connectedness from the point of view of a camera), the foreground/background separation process may only output one blob corresponding to both humans. When two or more previously detected blobs are detected as one blob, the blobs are considered to have merged. When the humans separate, the humans may again be detected by the foreground/background separation process as two separate blobs after previously being detected one as blob. One previously detected blob may be detected as more than one blob, because the blob has split. However, detection failures in the foreground/background separation process may also cause multiple blobs to be detected for one object. A video object tracker may not be able to discern between a split and detection failure in the foreground/background separation process.

A conventional method of tracking an object uses a mean shift algorithm and colour distribution of the object being tracked to find the object within the scene based on a visual appearance of the object. The method adds robustness where the object being tracked is partially occluded by one or more others objects. However, the method may not completely support merges and splits due to the lack of context in detections. While some segmentation of occluding objects may be possible using the mean shift algorithm and colour distribution method, occluded objects can easily be lost. Further, a video object tracker using the method can become stuck in a local maxima. Additionally, the lack of context in the detections may create problems when initialising tracks, such as tracks that are initialised on blobs containing more than one object. A Kalman filter may also be used with the mean shift algorithm and colour distribution method for predicting the location of a track in order to reduce search space. However, such iterative visual methods are computationally expensive when compared to a "geometric" tracker which uses foreground blob shapes and positions only. Such visual methods can be too computationally demanding to implement on a low-power device such as a video camera. Thus, a need exists to provide an improved method, apparatus and system for tracking objects in a sequence of images, that is both robust to continual interactions between objects and that is relatively computationally inexpensive.

SUMMARY

It is an object of the present invention to substantially overcome, or at least ameliorate, one or more disadvantages of existing arrangements.

According to one aspect of the present disclosure there is provided a method of tracking objects of a scene, said method comprising:

determining two or more tracks which have merged, each track being associated with at least one of the objects and having a corresponding graph structure, each graph structure comprising at least one node representing the corresponding track;

creating a new node representing the merged tracks;

adding said graph structures as children nodes of the new node to create a merged graph structure;

detecting a split between the objects associated with one of the tracks represented by said nodes of the merged graph structure;

determining similarity between one or more of said nodes in the merged graph structure and foreground areas corresponding to split objects;

selecting one of said nodes in the merged graph structure based on the determined similarity; and creating a new graph structure for tracking the objects in response to the detection of the split, the new graph structure having the selected node at the root of the new graph structure.

According to another aspect of the present disclosure there is provided a system for tracking objects of a scene, said system comprising:

a memory for storing data and a computer program;

a processor coupled to said memory for executing said computer program, said computer program comprising instructions for:

determining two or more tracks which have merged, each track being associated with at least one of the objects and having a corresponding graph structure, each graph structure comprising at least one node representing the corresponding track;

creating a new node representing the merged tracks;

adding said graph structures as children nodes of the new node to create a merged graph structure;

detecting a split between the objects associated with one of the tracks represented by said nodes of the merged graph structure;

determining similarity between one or more of said nodes in the merged graph structure and foreground areas corresponding to split objects;

selecting one of said nodes in the merged graph structure based on the determined similarity; and creating a new graph structure for tracking the objects in response to the detection of the split, the new graph structure having the selected node at the root of the new graph structure.

According to still another aspect of the present disclosure there is provided an apparatus for tracking objects of a scene, said apparatus comprising:

means for determining two or more tracks which have merged, each track being associated with at least one of the objects and having a corresponding graph structure, each graph structure comprising at least one node representing the corresponding track;

means for creating a new node representing the merged tracks;

means for adding said graph structures as children nodes of the new node to create a merged graph structure;

means for detecting a split between the objects associated with one of the tracks represented by said nodes of the merged graph structure;

means for determining similarity between one or more of said nodes in the merged graph structure and foreground areas corresponding to split objects;

means for selecting one of said nodes in the merged graph structure based on the determined similarity; and means for creating a new graph structure for tracking the objects in response to the detection of the split, the new graph structure having the selected node at the root of the new graph structure.

According to still another aspect of the present disclosure there is provided a computer readable medium having a computer program stored thereon for tracking objects of a scene, said program comprising:

code for determining two or more tracks which have merged, each track being associated with at least one of the objects and having a corresponding graph structure, each graph structure comprising at least one node representing the corresponding track;

code for creating a new node representing the merged tracks;

code for adding said graph structures as children nodes of the new node to create a merged graph structure;

code for detecting a split between the objects associated with one of the tracks represented by said nodes of the merged graph structure;

code for determining similarity between one or more of said nodes in the merged graph structure and foreground areas corresponding to split objects;

code for selecting one of said nodes in the merged graph structure based on the determined similarity; and code for creating a new graph structure for tracking the objects in response to the detection of the split, the new graph structure having the selected node at the root of the new graph structure.

Other aspects of the invention are also disclosed.

BRIEF DESCRIPTION OF THE DRAWINGS

One or more embodiments of the invention will now be described with reference to the following drawings, in which:

FIGS. 14A to 14F shows the graphs corresponding to the tracks in FIGS. 13A to 13F.

DETAILED DESCRIPTION INCLUDING BEST MODE

Context

Figure 1A:
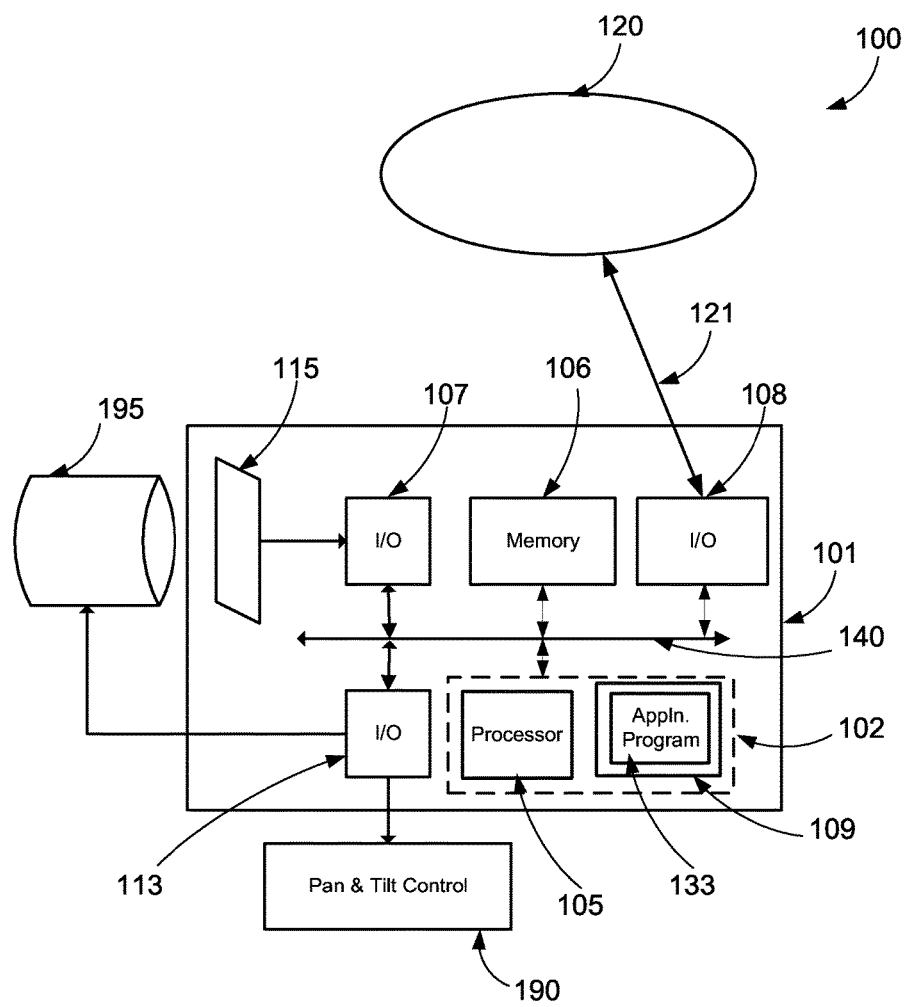
FIGS. 1A and 1B are a schematic block diagram of a camera, upon which methods described below, may be practiced.

Where reference is made in any one or more of the accompanying drawings to steps and/or features, which have the same reference numerals, those steps and/or features have for the purposes of this description the same function(s) or operation(s), unless the contrary intention appears.

A video is a sequence of images or frames. Each frame is an image in an image sequence (video sequence). Each frame of the video has an x axis and a y axis. A scene is the information contained in a frame and may include, for example, foreground objects, background objects, or a combination thereof.

A scene model is stored information relating to a scene and may include foreground information, background information, or a combination thereof. A scene model generally relates to background information derived from an image sequence.

A video may be encoded and compressed. Such encoding and compression may be performed intra frame, such as motion-JPEG (M JPEG), or inter-frame, such as specified in the H.264 standard.

The present disclosure relates to methods of real-time geometric tracking of foreground objects in an image captured of a scene. The described methods provide consistency of track identifiers through interactions of foreground objects, which can be recognised as merges and splits of foreground blobs. The foreground blobs may also be referred to as foreground regions.

An image is made up of visual elements. The visual elements may be, for example, pixels, or 8×8 DCT (Discrete Cosine Transform) blocks as used in JPEG images in a motion-JPEG stream, or wavelet domain transformed images as used in JPEG2000 images in a motion-JPEG2000 stream. A visual element position in the frame axis is represented by x and y coordinates of the visual element under consideration.

One representation of a visual element is a pixel visual element. Each visual element may have three (3) values describing the visual element. In one example, the three values are Red, Green and Blue colour values (RGB values). The values representing characteristics of the visual element are termed as visual element attributes. The number and type of values associated with each visual element (visual element attributes) depend on the format utilised for an apparatus implementing methods described below. It is to be noted that values stored in other colour spaces, such as the four-valued Cyan, Magenta, Yellow, and Key black (CMYK), or values representing Hue-Saturation-Lightness, may equally be utilised, depending on the particular implementation, without departing from the spirit and scope of the present disclosure.

Another representation of a visual element uses 8×8 DCT blocks as visual elements. The visual element attributes for an 8×8 DCT block are sixty-four (64) luminance DCT coefficients, sixty-four (64) chrominance red (Cr) DCT coefficients, and sixty-four (64) chrominance blue (Cb) DCT coefficients of the block. The sixty-four (64) luminance DCT coefficients can be further divided into one (1) DC coefficient, and sixty-three (63) AC coefficients. The DC coefficient is a representation of average luminance value of the visual element and the AC coefficients represent the frequency domain information of the luminance characteristics of the 8×8 block. The AC coefficients are commonly ordered from lowest-frequency to highest frequency components, organised in a zig-zag fashion. AC1 represents the DCT component with the lowest horizontal frequency. AC2 represents the horizontal component with the lowest vertical frequency, and so on. The higher-numbered AC coefficients correspond to higher frequencies. The attributes are represented as (Y, U, V, AC), representing the DC coefficient (Y), the chrominance values (U, V) and the AC coefficients (AC), giving one hundred and ninety six (196) attributes in total. Many other combinations of attributes are possible or other attributes can be generated from the above mentioned attributes using machine learning algorithms, such as linear regression techniques.

The described methods may equally be practised using other representations of visual elements. For example, the DCT blocks may be of a different size to enable a different granularity for storing the attributes of the pixels represented by the DCT blocks. Other transforms, such as wavelet transforms, may also be used to generate representative attributes from the pixels within a scene so that a historical representation of the scene may be accumulated.

As described below, a track is associated with at least one corresponding object within a sequence of images. Each track has at least one track representation in a set of track representations. Each track representation maintains a geometric model of the track, including height, width, and location of a centre point of a bounding box corresponding to the object associated with the track. The centroid of the track may be maintained instead of the centre point of the track bounding box. Each track representation in a set of track representations also maintains an estimate of the velocity of the corresponding object. Each track representation may also maintain a visual signature for the object corresponding to the track, such as luminance and chrominance histograms or a colour histogram. A track may also be associated with part of an object or more than one object.

A Directed Interaction Graph (DIG) is a hierarchical structure of tracks which indicates interactions between tracks. A DIG will be referred to more generally below as a "graph". A DIG can be considered analogous to a Directed Acyclic Graph (DAG) with a single root node. A DAG can in turn be considered analogous to a K-ary tree, where each node in the K-ary tree can have up to K children.

A graph contains one or more nodes, and may not contain any edges. Each node (vertex) in a given graph represents a track that has existed at some previous point in time. As such, each track has a corresponding graph structure with each graph structure comprising at least one node representing the corresponding track.

The edges in a graph correspond to merges between tracks. Each merge is a subset of interactions of tracks. A merge occurs due to spatial connectivity of two or more tracks in a video frame. A node representing a track in the graph may have a parent, children or sibling nodes. Children of a given node have merged to form the given node at a previous point in time. A given node with a parent will have merged with a corresponding sibling node to form the parent node of the given node. Two sibling nodes in a graph can be said to have exhibited spatial connectivity at a previous point in time.

The root node of a graph may be referred to as an active track and the other nodes of the graph may be referred to as inactive tracks. Active tracks are tracks that are actively (currently) tracking distinct data. The distinct data may be a set of merged objects or a singularly detected object. Inactive tracks are tracks that are not currently actively tracking such distinct data but previously actively tracking the distinct data. For example, an inactive track may be a track that has previously merged with one or more other tracks. As described below, a new graph containing a single (active) track is created for a detected blob that is not matched to any active tracks.

When tracks merge, a new graph is created. The node at the root of the new graph corresponds to objects of each of the merged tracks. Alternatively, if all of the merging tracks correspond to part of an object the node at the root of the new graph corresponds to the object formed by the merged tracks. The new graph may be used to track the foreground blob corresponding to the merged track in subsequent frames as the merged track moves through a scene, until the objects of the merged track either: split, leave the scene, or merge with one or more other tracks.

As described above, a graph is a hierarchical structure of nodes where each node represents a track. The term root node refers to the root of the graph, where the root node represents an active track. All other nodes in the graph that are not the root node represent inactive tracks.

The graph is maintained by a video object tracker while an object is tracked through a scene. A sub-graph of a given node in a graph is the graph that would be created by isolating the given node and all descendants of the given node. A sub-graph does not include any ancestors of the given node.

As described above, when tracks merge, a new root node is created to track the merged objects of the merged tracks. The merged tracks are root nodes of their corresponding graphs, where the corresponding graphs are also merged with their root node. The merging graphs are added as children of the new root node of the new graph, maintaining their corresponding hierarchies. Nodes that are not the root node in the graph (i.e., nodes that represent inactive tracks) contain the state of a previously maintained track, wherein the state of the previously maintained track is generally the state of the track prior to the merge. As described below, graph structures corresponding to tracks associated with a split may be merged.

As graphs continually merge, the depth of the resultant graph increases with each successive merge. Thus, the maximum depth of a graph may be limited. One method of limiting graph depth is to delete any nodes of the graph beyond a given maximum depth for the graph.

Other methods can also be used to stop the graph from becoming too deep due to frequent merges. In some cases, graphs may be prevented from being merged, such as when the merging graph is likely to be noise. For example, a recently created graph may be due to a misdetection of a foreground blob from a moving background like swaying branches. In other cases, the children of the root node of a merging graph may be merged, instead of the root node of the merging graph. For example, consider a graph recently created due to a merge that again merges within a short period of time. It is unlikely that a blob corresponding to the merged objects of the newly created graph will be seen again as the merged objects are only seen spatially connected for a very short period of time. Thus, the track corresponding to the merged objects is deleted during the merge, and the children of the track are merged instead. A graph may be split into more than one graph when some conditions are met. For example, a graph may be split when multiple foreground blobs that matched the graph are moving apart, exhibit independent motion, are too sparse, or are too far apart. When the graph splits, the graph is divided for the given foreground blobs, resulting in multiple graphs. The number of resultant graphs will correspond to the number of splitting foreground blobs.

The graph may be divided by comparing each node in the graph to each splitting foreground blob to obtain similarity scores. A best similarity score between each node and corresponding foreground blob in a selected association hypothesis is determined. The similarity score represents similarity between one or more of the nodes in the graph structure and one or more given foreground blobs. By using the best similarity score for each node, the graph can be divided iteratively in a greedy manner.

The node with the best similarity score may be found and selected. The selected node may be removed from the graph along with hierarchy underneath (i.e., descendants nodes of) the selected node (i.e., the sub-graph of the selected node is removed). Ancestors of the selected node may be marked for deletion and can no longer be selected. Such an iterative dividing process may be continued iteratively until all nodes in the graph have either been removed, or marked for deletion.

Once the iterative dividing process is completed, each foreground blob is considered. If the foreground blob does not have a corresponding sub-graph (i.e., none of the removed nodes had the foreground blob as a best match), then a new active track is created for the foreground blob. If the foreground blob had one corresponding sub-graph, then the sub-graph becomes a graph by setting the root node of the sub-graph to be an active track. If the foreground blob had more than one corresponding sub-graph, then the sub-graphs are combined to form a new graph. The combining process used form the new graph is the same as the graph merging process described above.

Dividing a graph, as described above, removes the dependency on n merged tracks being resolved to n split tracks (i.e., the dividing a graph removes the dependency on having a 1:1 correlation). The removal of such a dependency allows for real-time decisions to be made when splits are detected, and allows for more complex interactions to be accepted by the video object tracker without needing to either label the tracks as fragments, objects or groups, or without making assumptions on how many real-word objects are present in an interaction.

Figure 1B:
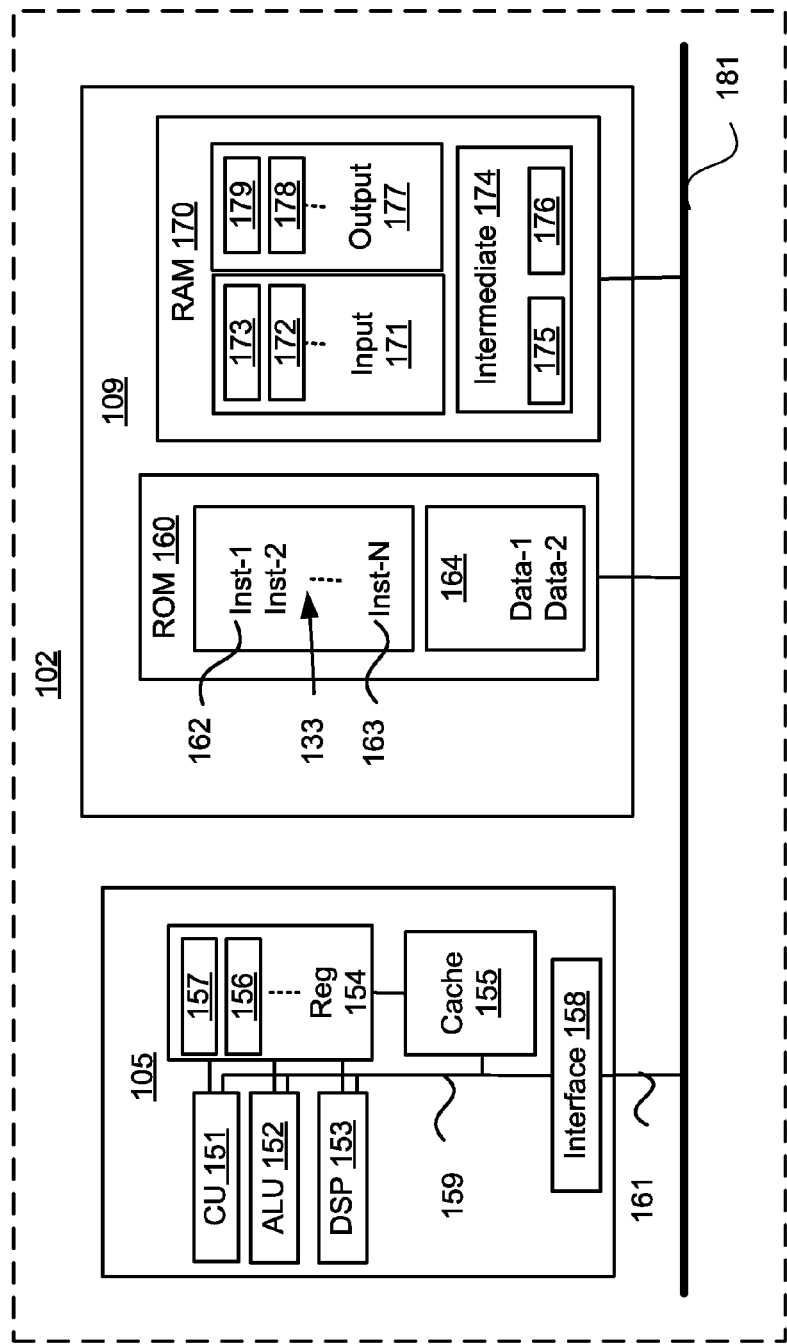

FIGS. 1A and 1B are a schematic block diagram of a camera 100, upon which described methods may be practiced. The camera 100 is a pan-tilt-zoom camera (PTZ). The camera 100 comprises a camera module 101, a pan and tilt module 190, and a lens system 195.

As seen in FIG. 1A, the camera module 101 comprises an embedded controller 102. In the present example, the embedded controller 102 includes at least one processor unit 105 (or processor) which is bi-directionally coupled to an internal storage module 109. The storage module 109 may be formed from non-volatile semiconductor read only memory (ROM) 160 and semiconductor random access memory (RAM) 170, as seen in FIG. 1B. The RAM 170 may be volatile, non-volatile or a combination of volatile and non-volatile memory.

As seen in FIG. 1A, the camera module 101 also comprises a portable memory interface 106 which is coupled to the processor 105. The portable memory interface 106 allows a complementary portable memory device to be coupled to the camera module 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The camera module 101 also comprises an input/output (I/O) interface 107 that couples to a photo-sensitive sensor array 115.

The camera module 101 also comprises a communications I/O interface 108 that couples to a communications network 120 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

The camera module 101 also comprises an I/O interface 113 for the pan and tilt module 190 and the lens system 195.

The components, which include the sensor I/O interface 107, embedded controller 102, communications I/O interface 108, control interface 113 and memory interface 106 of the camera module 101, typically communicate via an interconnected bus 140 and in a manner which results in a conventional mode of operation known to those in the relevant art.

The described methods may be implemented using the embedded controller 102, where the processes of FIGS. 2 to 14F may be implemented as one or more software application programs 133 executable within the embedded controller 102. The camera module 101 of FIG. 1A implements the described methods. In particular, with reference to FIG. 1B, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the camera module 101. However, in some instances, the application programs 133 may be supplied to the user encoded on one or more CD-ROM (not shown) and read via the portable memory interface 106 of FIG. 1A prior to storage in the internal storage module 109 or in the portable memory as described above. In another alternative, the software application program 133 may be read by the processor 105 from the network 120, or loaded into the controller 102 or such portable storage medium from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the camera module 101. Examples of transitory or non-tangible computer readable transmission media that may also participate in the provision of software, application programs, instructions and/or data to the camera module 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

FIG. 1B illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the camera module 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152, a digital signal processing (DSP) unit 153 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the camera module 101.

Typically, the application program 133 waits for events and subsequently executes the block of code associated with that event. Events may be triggered in response to input from the interfaces 107, 108 and 113 of the camera module 101.

The execution of a set of the instructions may require numeric variables to be read and modified. Such numeric variables are stored in the RAM 170. The described methods use input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the camera module 101. The camera 100 may be used to capture input images representing the visual content of a scene appearing in the field of view of the camera 100. The visual content may include one or more foreground objects and one or more background objects.

Figure 2:
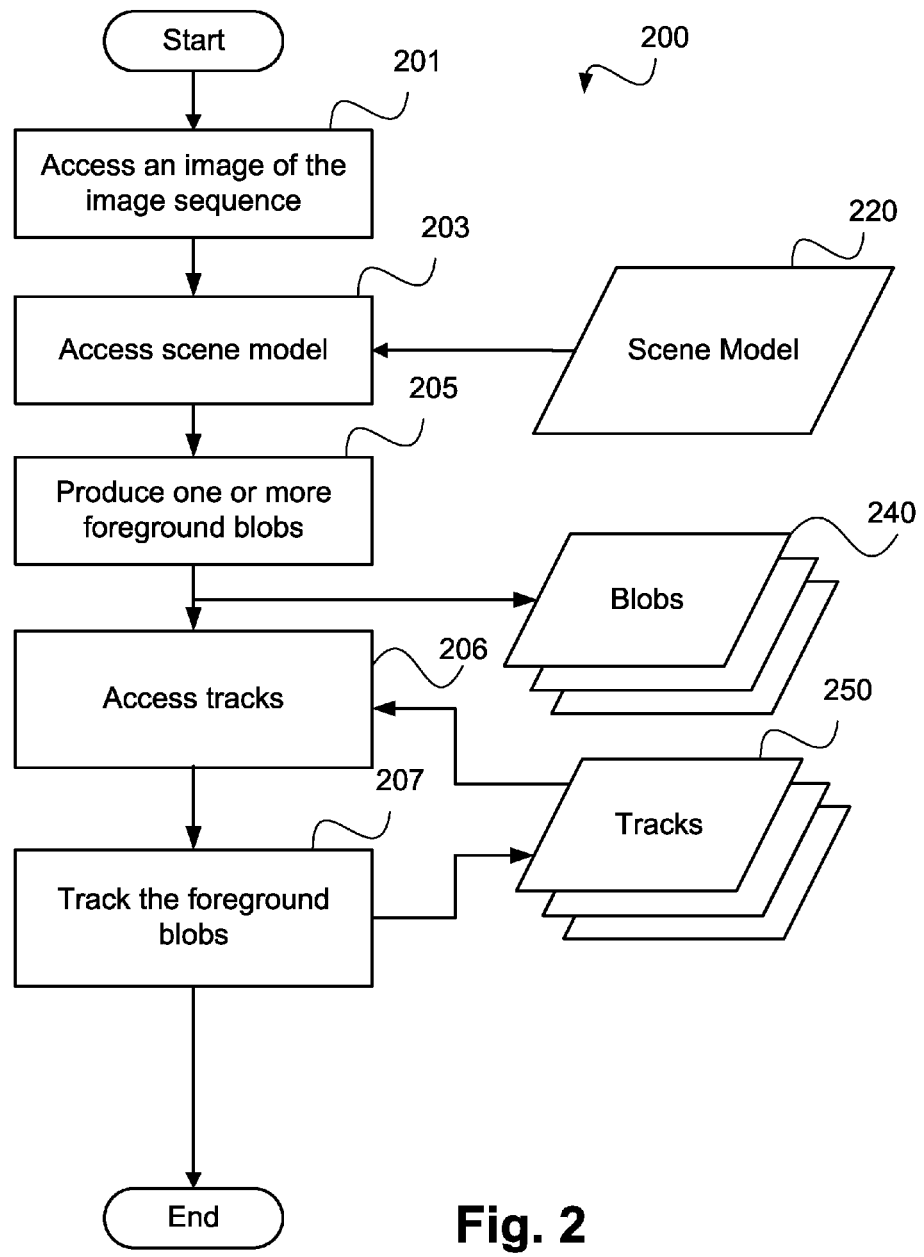
FIG. 2 is a flow diagram showing a method of tracking an object in an input image of a sequence of images captured on the camera of FIGS. 1A and 1B.

FIG. 2 is a schematic flow diagram showing a method 200 of tracking one or more objects in a sequence of images captured of a scene. The method 200 may be implemented as one or more code modules of the software application program 133 resident in the storage module 109 of the camera 100 and being controlled in its execution by the processor 105. The method 200 may be used for tracking a plurality of objects of the scene.

The method 200 begins at image accessing step 201, where the processor 105 accesses an image of the sequence of images captured by the camera 100. The image may be accessed at step 201 from the storage module 109. For example, the accessed image may have been captured by the camera 100 and stored within the RAM 170 of the storage module 109 prior to execution of the method 200.

At accessing step 203, the processor 105 accesses a scene model 220 for the image. As described above, the scene model 220 is stored information relating to the scene captured in the image and may include foreground information, background information, or a combination thereof. Again, the scene model 220 may be accessed from the storage module 109.

Then at foreground/background separation step 205, the processor 105 executes a foreground/background separation method, using the input image and the scene model 220 accessed at steps 201 and 203, respectively, to produce (or identify) one or more foreground blobs 240. As described above, the foreground blobs 240 may also be referred to as foreground regions as the foreground blobs 240 represent foreground areas of the scene. Further, the foreground blobs 240 may also be referred to as detections.

Also at step 205, the processor 105 determines relevant statistics corresponding to each of the foreground blobs 240 determined at step 205. Such statistics may include, for example, the size, age, bounding box, and centroid of the foreground blob. The foreground blobs 240 and statistics may be stored within the storage module 109.

Also at step 205, the processor 105 updates the scene model 220 for the scene captured in the image, allowing background information and foreground information for the scene to be learnt over time. Any suitable foreground/background separation method may be used at step 205. For example, background subtraction, a mixture of Gaussians, or other methods of foreground separation using background modelling, may be executed by the processor 105 at step 205.

At accessing step 206, the processor 105 accesses a set of tracks 250 associated with one or more objects corresponding to the foreground blobs 240 within the image. The set of tracks 250 may have been stored within the storage module 109, for example, together with the scene model, prior to execution of the method 200.

At tracking step 207, the processor 105 performs tracking of the foreground blobs 240 generated at step 205 using the set of tracks 250. The foreground blobs 240 are tracked as foreground objects. Tracks in the set of tracks 250 are updated and maintained by the processor 105 as part of step 207. A method 400 of "geometric" tracking of foreground blobs, as executed at step 207, will be described in detail below with reference to FIG. 4.

Figure 3:
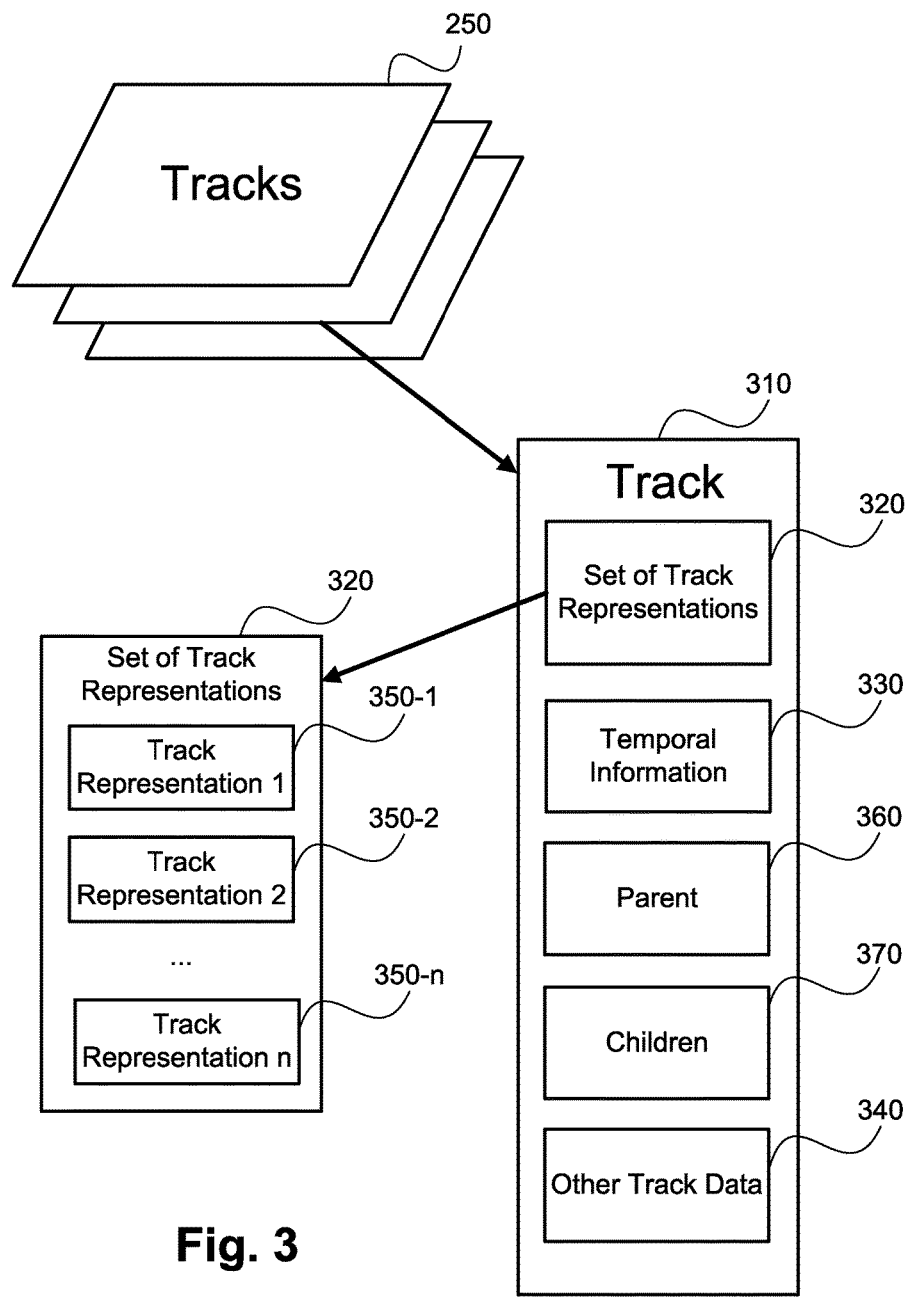
FIG. 3 is a schematic block diagram showing an example of data stored in a single track.

FIG. 3 is a schematic block diagram showing an example of a track 310 of the set of tracks 250 used at step 207. The methods will be described below by way of example where the track 310 is associated with the object being tracked by the method 200.

Each track 310 of the set of tracks 250 has a set of track representations 320. The set of track representations 320 contains at least one track representation (e.g., 350-1), with extra track representations (e.g., 350-2 to 350-n) being created and deleted at step 207 as required. A track representation 350-1 contains an estimation of the state of the track 310, including coordinates (x location, y location) of the centre of a bounding box of the object corresponding to the track, height of the bounding box of the object corresponding to the track, width of the bounding box of the object corresponding to the track and velocity of the centre of the object corresponding to the track. In another arrangement, a track representation 350-1 may use coordinates of the centroid of the object corresponding to the track 320 instead of the coordinates of the centre of the bounding box 320. In another arrangement, a track representation 350-1 may include a quantised histogram of luminance and a quantised histogram of hue of the object corresponding to the track 320, where the hue is an angle formed by a vector (chrominance red, chrominance blue). In another arrangement, a track representation 350-1 may include a normalised colour histogram of the object corresponding to the track 320, such as an RGB histogram, HSL histogram or YCbCr histogram.

The foreground blobs 240 produced by the foreground/background separation method executed at step 205 and the set of tracks 250 stored within storage module 109 and updated during step 207 may be used for further processing as part of video analytics. For example, the foreground blobs 240 and tracks 250 may be used to detect abandoned objects, removed objects, loitering, intrusion, congestion, and other high level events that might be of interest.

As seen in FIG. 3, each track 310 in the set of tracks 250 also contains temporal information 330 about the track 310, such as, a window of when the track 310 was last matched to one or more foreground blobs 240. Each track 310 also contains an indicator 360 of, or back pointer to, a parent track in the graph, if the track 310 has a parent. An active track as represented by the root node of a graph will not have a parent. An inactive track will have a parent. Each track 310 also contains a list 370 of the children for the track 310 in the graph, if the track 310 has children. Each track 310 may also contain other information 340 about the track 310, as required, such as, a unique track identifier used to uniquely identify the track 310.

Figure 4:
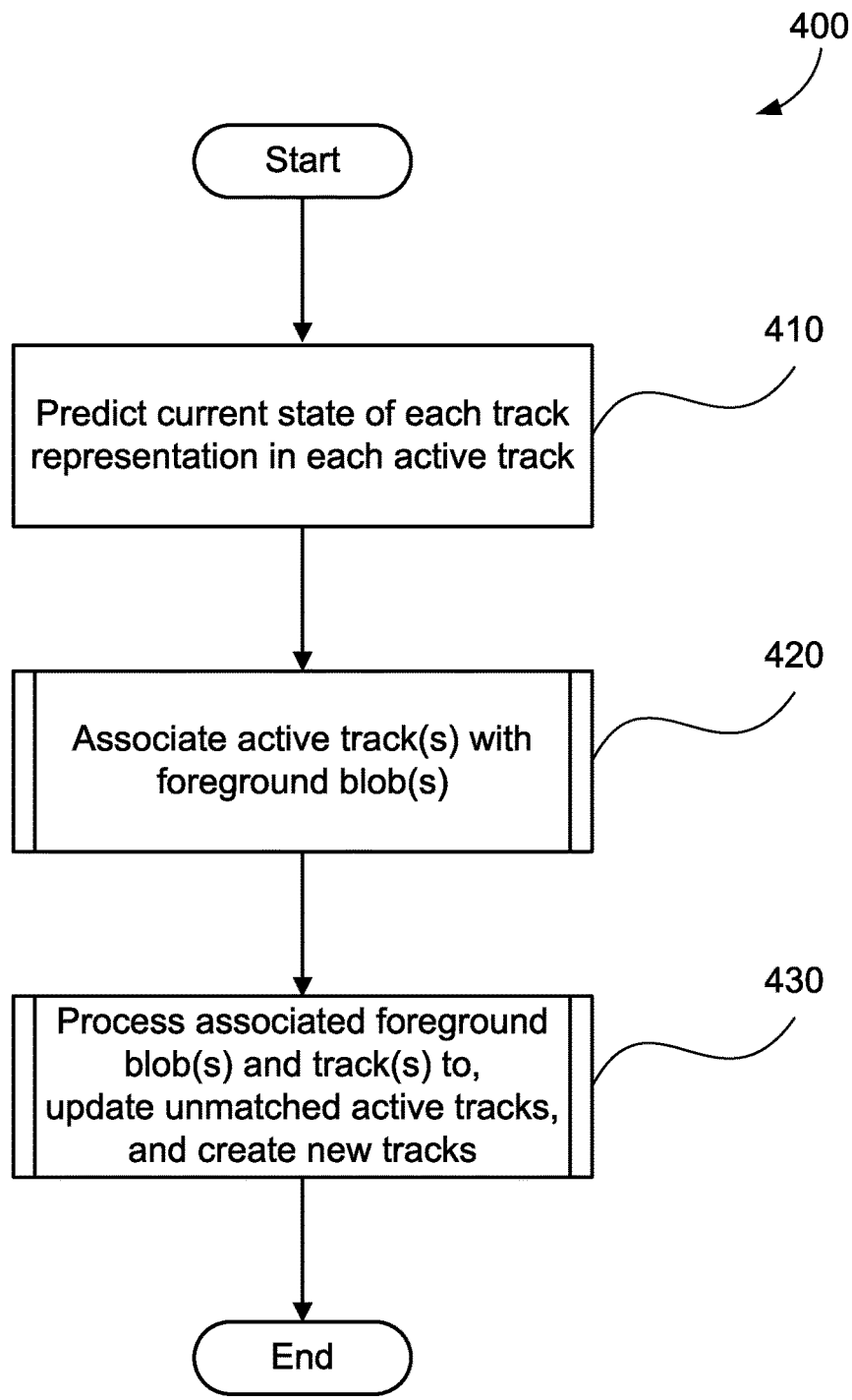
FIG. 4 is a schematic flow diagram showing a geometric method of tracking foreground blobs ("detections") as used in the method of FIG. 2.
Figure 5:
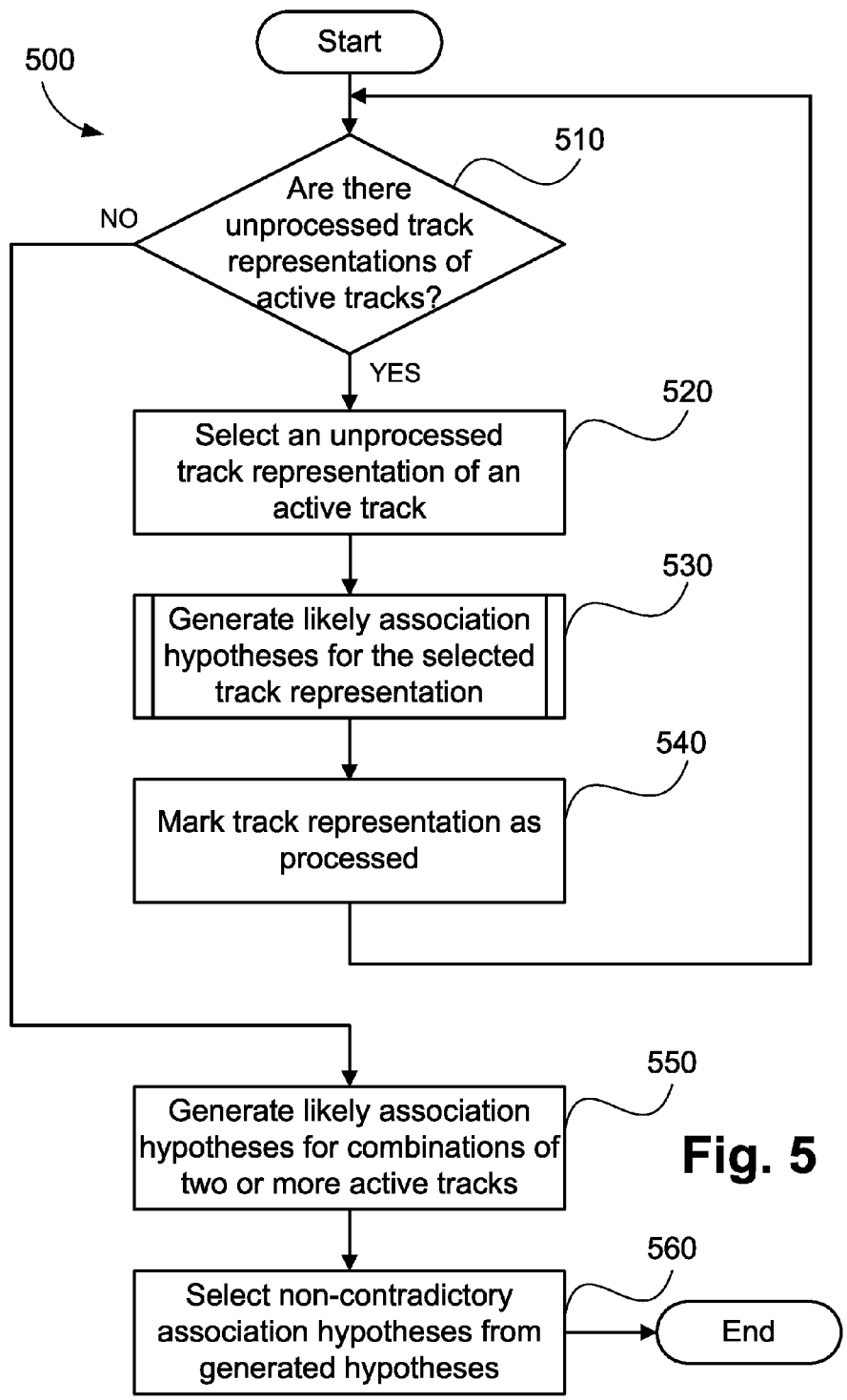
FIG. 5 is a schematic flow diagram showing a method of associating foreground blobs with tracks as used in the method of FIG. 4.

FIG. 4 is a schematic flow diagram showing a method 400 of "geometric" tracking of foreground blobs as foreground objects, as executed at step 207. The method 400 processes foreground blobs associated with one image, which is the image accessed at step 201. The method 400 may be implemented as one or more code modules of the software application program 133 resident in the storage module 109 of the camera 100 and being controlled in its execution by the processor 105.

The method 400 begins at prediction step 410, where the processor 105 predicts the current state of each track representation 350-1, 350-2 to 350-$n$ in the set of track representations 320 for each active track 310 (i.e., each track 310 that is the root node of a graph) of the set of tracks 250.

The predicted state of a track representation (e.g., 350-1) is based on velocity of the track representation 350-1, previous states of the track representation 350-1 and elapsed time since a last observation.

At data association step 420, the processor 105 associates active tracks of the set of tracks 250 with foreground blobs 240. In particular, the processor 105 creates a list of "association hypotheses" which may be stored within the RAM 170 of the storage module 109. As described below, the list of association hypotheses is reduced to a non-contradictory set of association hypotheses. An association hypothesis is a likely combination of one or more track representations (e.g., 350-1), where each track 310 has at most one track representation (e.g., 350-1) per association hypothesis, and one or more of the foreground blobs 240 (or "detections"). In the non-contradictory set of association hypotheses, each track 310 will have at most one track representation (e.g., 350-1) in the non-contradictory list, and each foreground blob of the foreground blobs 240 (or detections) will be in the non-contradictory set at most once. Each association hypothesis in the resultant non-contradictory set of association hypotheses therefore contains a set of matching tracks 310 and foreground blobs 240. A method 500 of associating one or more of the foreground blobs 240 with one or more active tracks 310, as executed at step 420, will be described in detail below with reference to FIG. 5.

At track management step 430, the processor 105 accesses each association hypothesis in the resultant non-contradictory list of association hypotheses stored within the storage module 109. For each association hypothesis the processor 105 either: splits (divides) the graph that the track 310 in a given association hypothesis is the root node of; merges the graphs that the track 310 in a given association hypothesis are the root nodes of; or uses the one or more foreground blobs (or detections) in a given association hypothesis to update each track representation 350-1, 350-2 and 350-$n$ for the track 310 in the given association hypothesis. Also at the track management step 430, the processor 105 updates active tracks that are not in the non-contradictory set of hypotheses. The active tracks updated at step 430 that are not in the non-contradictory set of hypotheses are referred to as unmatched tracks. Also at step 430, new active tracks are created for foreground blobs that are not in the non-contradictory set of association hypotheses. The foreground blobs that are not in the non-contradictory set of association hypotheses are referred to as unmatched foreground blobs. A method 700 of updating each track representation of a track, as executed at step 430, will be described in detail below with reference to FIG. 7. The method 700 may be used for managing tracks. The method 500 of associating one or more of the foreground blobs 240 with tracks 310 of the set of tracks 250, as executed at step 420, will now be described in detail below with reference to FIG. 5. The method 500 may be implemented as one or more code modules of the software application program 133 resident in the storage module 109 of the camera 100 and being controlled in its execution by the processor 105.

The method 500 begins at decision step 510, where if the processor 105 determines that all of the track representations 350-1, 350-2 to 350-$n$ in the set of track representations 320 for each active track 310 in the set of tracks 260 have been processed, then the method 500 proceeds directly to step 550. Otherwise, if there are remaining unprocessed track representations 350-1, 350-2 to 350-$n$, then the method 500 proceeds to selection step 520.

At selection step 520, the processor 105 selects an unprocessed track representation (e.g., 350-1) from an active track 310.

Then at generation step 530, the processor 105 generates likely association hypotheses for the track representation 350-1 selected at step 520. In particular, at step 530, the processor 105 takes the track representation 350-1 selected at step 520 and combines the selected track representation 350-1 with likely combinations of foreground blobs 240. Any combination of track representation 350-1 and one or more of the foreground blobs 240 that is more likely than a set threshold may be combined into an association hypothesis. In one arrangement, the threshold may be four (4.0). The determined association hypothesis is added to the list of association hypotheses created at step 420 and stored in the RAM 170 of the storage module 109. A method 600 of generating likely association hypotheses for the selected track representation 350-1, as executed at step 530, will be described in detail below with reference to FIG. 6.

At marking step 540, the processor 105 marks the track representation selected at selection step 520 as processed.

Following step 540, the method 500 returns to the decision step 510. As described above, if the processor 150 determines that there are no remaining unprocessed track representations 350-1, 350-2 to 350-$n$, then the method 500 continues to generate step 550.

At generate step 550, the processor 105 generates likely association hypotheses for combinations of more than one track representation 350-1 from different active tracks with one foreground blob 240. The likely association hypotheses are generated at step 550 for combinations of more than one track representation in a similar manner to which the likely association hypotheses are generated in steps 520 and 530. The likely association hypotheses generated by step 550 are added to the list of likely association hypotheses generated by step 530 and stored in the RAM 170 of the storage module 109. After the generate step 550, the method 500 continues to select step 560.

As described above, the association hypotheses are generated independently for each combination of one or more foreground blobs (or detections) and one or more track representations 350-1, 350-2 to 350-n of active tracks 310. Accordingly, some association hypotheses attempt to associate the same foreground blob, or even the same combination of foreground blobs, to different track representations 350-1, 350-2 to 350-n. Such contradictions may be undesirable. Thus, in one arrangement, step 560 may be used to reduce the list of association hypotheses stored in the storage module 109 to an optimal set of association hypotheses. In such an optimal set, each foreground blob appears in at most one association hypothesis. Further, each track 310, by way of one corresponding track representation (e.g., 350-1) from the set of track representations 320 for the track 310, appears in at most one association hypothesis.

In one arrangement, a Global Nearest Neighbour (GNN) or greedy method may be used to reduce the list of association hypotheses at step 560. Global Nearest Neighbour is an iterative algorithm that may be used to select an association hypothesis with a best likelihood of being correct and place the selected association hypothesis in the optimal set. All other association hypotheses that contain the same track 310, by way of the corresponding track representation (e.g., 350-1), or any of the foreground blobs represented by the selected association hypothesis, are then deleted from the list of association hypotheses stored in the storage module 109, as subsequently selecting the association hypotheses would create contradictions. In an alternative arrangement, every possible combination of association hypotheses may be evaluated to procedurally determine an optimal non-contradictory subset of association hypotheses according to a similarity measure. However, evaluating every possible combination of association hypotheses may be very computationally expensive. Thus, step 560 results in a non-contradictory set of association hypotheses that is a subset of the list of association hypotheses resulting from step 530 and step 550. In the non-contradictory subset of association hypotheses, each of the foreground blobs 240 appears in at most one association hypothesis and each track 310, by way of a corresponding track representation, appears in at most one association hypothesis.

In another arrangement, multiple tracks 310 may be matched to multiple foreground blobs of the foreground blobs 240. That is, an association hypothesis may contain two or more tracks and two or more foreground blobs.

Figure 6:
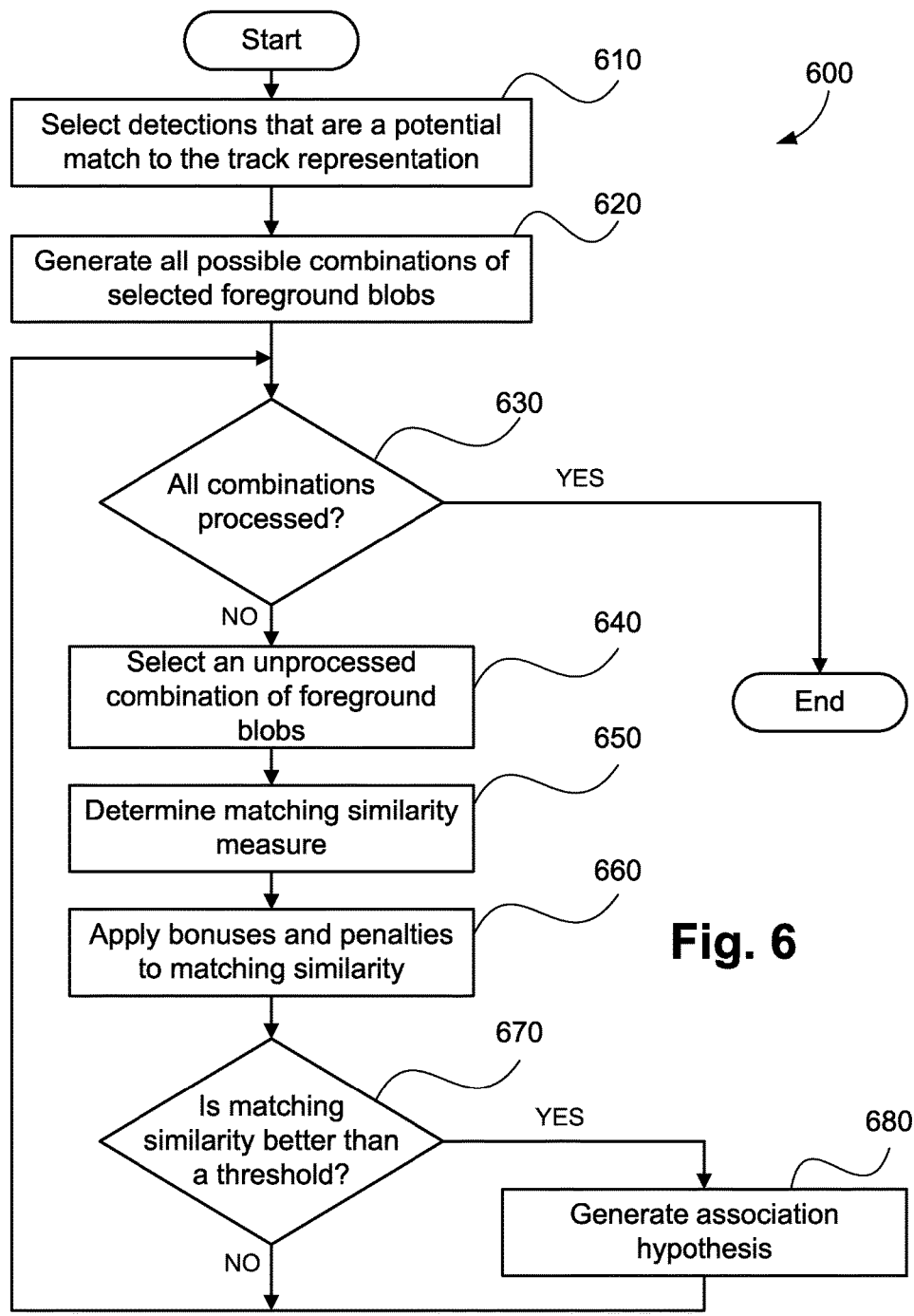
FIG. 6 is a schematic flow diagram showing a method of generating association hypotheses for a track representation as used in the method of FIG. 5.

The method 600 of generating association hypotheses for a track representation (e.g., 350-1), as executed at step 530, will now be described in detail below with reference to FIG. 6. The method 600 may be implemented as one or more code modules of the software application program 133 resident in the storage module 109 of the camera 100 and being controlled in its execution by the processor 105.

The method 600 begins at selection step 610, where the processor 105 identifies which of the foreground blobs 240 may be part of a likely match for the track representation (e.g., 350-1) selected in step 520. The identified foreground blobs may be added to a list of selected foreground blobs configured within the storage module 109.

In one arrangement, the processor 105 may use an ideal spatial extension to create an extended spatial representation of a particular foreground blob at step 610, in order to determine a likely match for the selected track representation 350-1. Ideal spatial extension extends a spatial representation of the foreground blob such that the centre point of the foreground blob moves towards, but not past, the centre point of the selected track representation 350-1. The height and the width of the foreground blob are extended until the height and width of the foreground blob are the same size as the height and width, respectively, of the track representation (e.g., 350-1) selected in step 520. If a dimension of the foreground blob is larger than the corresponding dimension of the selected track representation 350-1, then the dimension of the foreground blob is not extended.

After the foreground blob has undergone ideal spatial extension, a matching similarity measure may be determined between the extended spatial representation of the foreground blob and a prediction of the selected track representation 350-1 (also known as the expectation), as predicted in step 410. In one arrangement, the similarity measure may be a gating distance used by an Alpha Beta Filter based video object tracker. In another arrangement, the similarity measure may be a gating distance used by a Kalman Filter based video object tracker. In yet another arrangement, the similarity measure may be the gating distance used by a multi-state Alpha Beta Filter based video object tracker, which approximates a Kalman filter with a limited number of states before reaching a Cramer-Rao lower bound. In yet another arrangement, the similarity measure may be a fraction representing the area of overlap divided by total area occupied by the extended spatial representation of the foreground blob and the spatial prediction of the selected track representation 350-1. In still another arrangement, the similarity measure may be a sum of the discrepancies of edge positions.

The gating distance may be used to track rectangular objects with four components: location (x, y) and dimension (width, height).

As an example, let the extended spatial representation of the foreground blob have coordinates (x_representation, y_representation) and dimensions (w_representation, h_representation). Similarly, let the spatial prediction of the selected track representation 350-1 have coordinates (x_expectation, y_expectation) and dimensions (w_expectation, h_expectation).

In one arrangement, the similarity measure determination may also require predetermined variances in order to determine the gating distance. In such an arrangement, the predetermined variances may be determined prior to performing the tracking in step 260, by firstly generating foreground blobs from pre-recorded image sequences that together form a training set. Statistical variances may be determined representing error for the location, height and width.

Let the predetermined variance $\hat{x}$ denote the statistical variance of the horizontal distance between the centre of the spatial representation of the foreground blob and the centre of the spatial representation of the predicted track representation 350-1.

In one arrangement, the predetermined variance $\hat{x}$ is determined from a set of training data. The predetermined variance $\hat{x}$ is calculated by first determining the difference between the horizontal location of the spatial representation of the expectation and the horizontal location of the spatial representation of a foreground blob. Determination of such a difference may be repeated for the associated foreground blobs and track representations in the training set. Then, each difference may be squared, and the squares summed over multiple foreground blobs from the training data. Finally, the sum of the squares may be divided by the number of differences. Statistical variance $\hat{y}$; of the vertical distance may be determined in a similar manner, using the difference in the vertical locations. The statistical variance of the difference in the width $\hat{w}$ is determined in a similar manner, using the difference in widths. The statistical variance $\hat{h}$ of the difference in the height is determined in a similar manner, using the difference in heights.

Then, given the predetermined variances, the gating distance, dist, may be determined in accordance with Equation (1), as follows:

$$\text{dist} = \frac{(\text{x\_representation} - \text{x\_expectation})^2}{\hat{x}} + \frac{(\text{y\_representation} - \text{y\_expectation})^2}{\hat{y}} + \frac{(\text{w\_representation} - \text{w\_expectation})^2}{\hat{w}} + \frac{(\text{h\_representation} - \text{h\_expectation})^2}{\hat{h}} \quad (1)$$

The gating distance, dist, determined in accordance with Equation (1) produces a numerical result which is small if the extended spatial representation of the foreground blob and the spatial prediction of the selected track representation 350-1 are similar. The gating distance, dist, is large if the extended spatial representation of the foreground blob 240 and the spatial prediction of the selected track representation 350-1 are dissimilar. In one arrangement, the gating distance, dist, may be converted into a similarity measure, sim. In this instance, a large similarity measure, sim, represents high similarity between the extended spatial representation of the foreground blob 240 and the spatial prediction of the selected track representation. In one arrangement, the following transformation function of Equation (2) is applied:

$$\text{sim} = \frac{1}{\text{dist} + 1} \quad (2)$$

The similarity measure, sim, has a number of properties. Statistically, the distance between the spatial prediction of the selected track representation 350-1 and the spatial representation of a non-fragmented one of the foreground blobs 240 is within approximately one standard deviation. Dividing the square of the difference of each component (e.g., (x_representation−x_expectation)$^2$) by the variance (e.g., $\hat{x}$), scales error such that the contribution to the gating distance, dist, is one (1.0) unit for each component (i.e., x_representation, y_representation, w_representation, and h_representation). The determined gating distance, dist, should be less than the number of measured components (i.e., four (4.0) components in this arrangement), if the spatial representation of the foreground blob corresponds to the spatial prediction of the selected track representation 350-1. Thus, in one arrangement, the similarity measure, sim, is expected to be larger than zero-point-two (0.2) if the extended spatial representation of the foreground blob corresponds to the spatial prediction of the selected track representation 350-1. The value of zero-point-two (0.2) is suitable where the properties of the camera 100 have been measured to give the variances.

The similarity measure, sim, may then be used in a similarity threshold test. In one arrangement, if the value of the similarity measure, sim, determined for the foreground blob, is greater than a predetermined representation similarity threshold (e.g., 0.3), then the foreground blob is added to the list of selected foreground blobs configured within the storage module 109 at step 610. In another arrangement, a predetermined value of the similarity measure may be used, (e.g. 0.2) at step 610. In still another arrangement, if the gating distance dist determined for the foreground blob is less than a threshold (e.g., 4.0), then the foreground blob is added to the list of selected foreground blobs at step 610.

At step 610, the processor 105 may be said to be identifying and then selecting foreground blobs that are both a likely fragment of, and a likely direct match to, the selected track representation 350-1 (without ideal extension). The processor 105 may also be said to be selecting foreground blobs that are likely fragments of the selected track representation 350-1 (with ideal extension).

In one arrangement, the total number of foreground blobs identified at step 610 may be limited to a maximum value (e.g., eight (8) foreground blobs).

At generation step 620, the processor 105 generates all possible combinations of selected foreground blobs, including combinations consisting of just one foreground blob. In one arrangement, the total number of selected foreground blobs per combination may be limited to a maximum value (e.g., six (6) foreground blobs).

In one arrangement, depending upon the reason that the selected track representation 350-1 was created (e.g., due to a fragment/split event being detected), the processor 105 at step 620 generates combinations of foreground blobs that contain at most one foreground blob.

At decision step 630, if the processor 105 determines that not all combinations of foreground blobs generated at step 620 are processed, then the method 600 continues to step 640. Otherwise, the method 600 concludes.

At selection step 640, the processor 105 selects an unprocessed combination of foreground blobs in the list of foreground blobs stored within the storage module 109, and marks the unprocessed combination of foreground blobs as processed.

Then at determining step 650, the processor 105 determines a matching similarity measure for the selected combination of foreground blobs and the selected track representation 350-1. The matching similarity measure used at step 650 is the same matching similarity measure, dist, as described above with reference to step 610. The height, width and location for the combination of foreground blobs that is used in determining the matching similarity measure is obtained by creating a tight bounding box around the combination of foregrounds blobs. In one arrangement, a visual component is included in the matching similarity measure.

At applying step 660, the processor 105 applies selected bonuses and penalties to the matching similarity measure, based on heuristics, to create a final similarity measure. In one arrangement, a combination of bonuses and penalties may be applied to the matching similarity measure at step 660.

A first bonus is applied to the matching similarity measure at step 660 based on the number of foreground blobs in the combination of foreground blobs selected at step 640. For example, the similarity measure may be decreased by 0.1 per foreground blob in the combination of foreground blobs selected at step 640. The purpose of the first bonus is to encourage association hypotheses that include all fragments of the object being tracked in accordance with the method 200 to be selected at step 560. Outlying fragments that are not present in the selected set of non-contradictory association hypotheses may spawn extraneous noisy tracks.

Other bonuses and penalties may be applied based on further heuristics. For example, a bonus or penalty may be applied based on the match accuracy of certain edges (e.g. the vertical edges) and the reason the track representation 350-1 chosen at step 520 was created (e.g. due to a fragment/split event being detected).

The matching similarity measure after all bonuses and penalties are applied may be referred to as a final matching similarity measure.

After step 660, the method 600 continues to a threshold decision step 670. In another arrangement, step 670 is performed before step 660, and the matching similarity measure is used instead of the final matching similarity measure for step 670.

At decision step 670, the processor 105 compares the value of the final matching similarity measure to a threshold value. If the value of the matching similarity measure is less than the threshold value, then the method 600 continues to association hypothesis step 680. Otherwise, the method 600 returns to step 630.

At step 680, the processor 105 creates an association hypothesis and adds the association hypothesis created to the list of association hypotheses configured within the storage module 109. The list of association hypotheses generated at association hypothesis step 680 is used at selection step 550 to reduce the list of association hypotheses to a non-contradictory set of association hypothesis. The added association hypothesis represents a hypothesis that the combination of foreground blobs 240 selected at step 640 match the selected track representation 350-1. The association hypothesis includes the foreground blobs in the combination of foregrounds blobs selected at step 640, the selected track representation 350-1, the track that the selected track representation corresponds to, and the final matching similarity measure.

Figure 7:
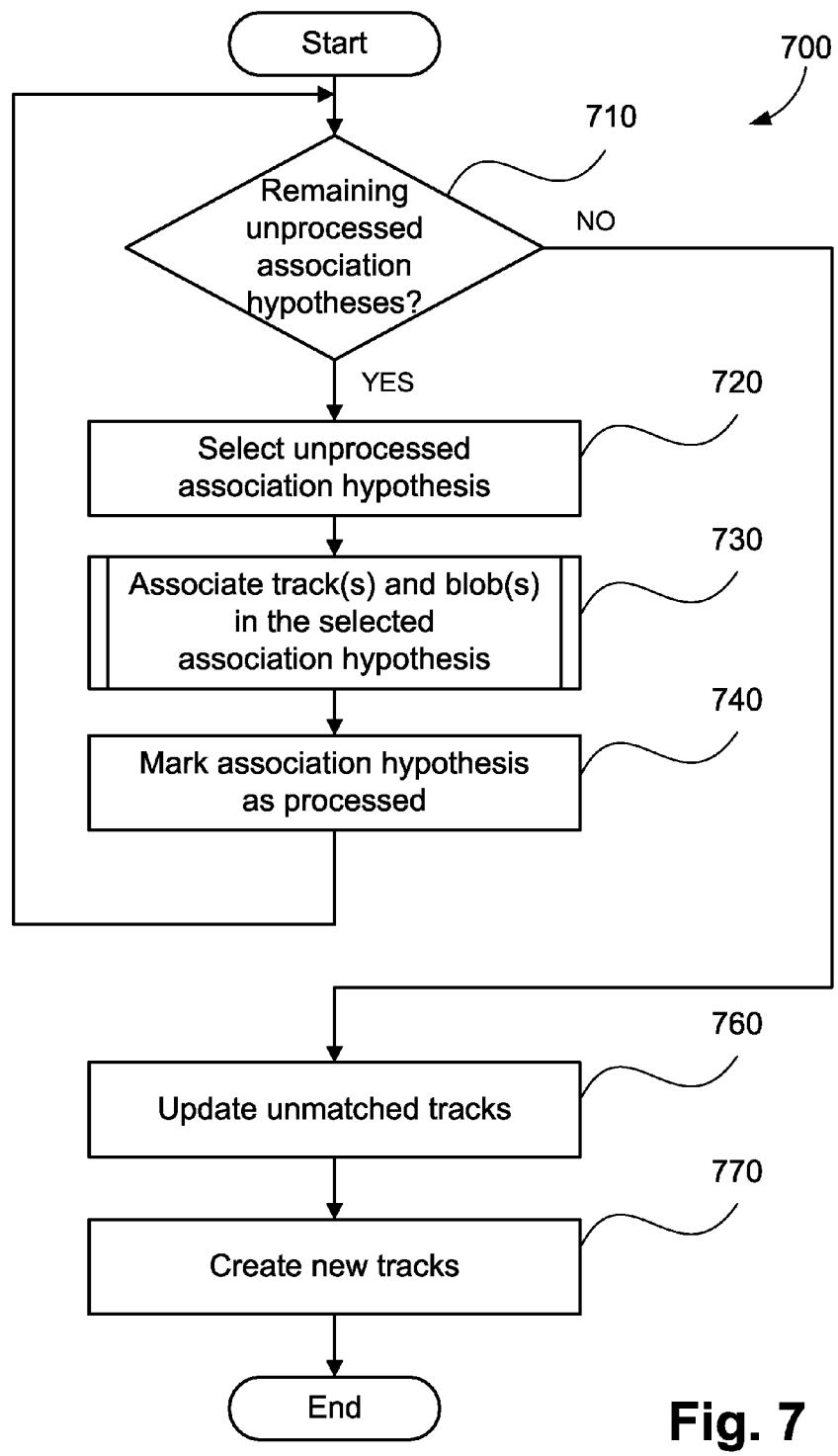
FIG. 7 is a schematic flow diagram showing a method of updating each track representation of a track, as used in the method of FIG. 4.

The method 700 of track management, as executed at step 430, will now be described with reference to FIG. 7. The method 700 processes the non-contradictory set of association hypotheses generated at step 560. The method 700 creates new tracks for unmatched foreground blobs and updates unmatched tracks. The method 700 may be implemented as software resident within the storage module 109 of the camera 100 and being controlled in its execution by the processor 105 of the camera 100.

The method 700 begins at decision step 710, where if the processor 105 determines that there are remaining unprocessed association hypotheses in the non-contradictory set of association hypotheses generated at step 560, then the method 700 proceeds to step 720. Otherwise, the method 700 proceeds directly to update step 760.

At selection step 720, the processor 105 selects an unprocessed association hypothesis from the non-contradictory set of association hypotheses stored within the storage module 109.

Then at associate step 730, the processor 105 associates the one or more tracks 310 in the association hypothesis selected at step 720 with the one or more foreground blobs 240 in the selected association hypothesis. Also at associate step 730, the processor 105 determines if the one or more tracks have merged, have split, or should be updated. For example, the processor 105 may be configured for determining two or more tracks which have merged. If a track 310 is to be updated, then new track representations (e.g. 350-2) may be created and added to the set of track representations 320 for the track being updated, or existing track representations (e.g. 350-2) in the set of track representations 320 may be deleted. All existing track representations (e.g. 350-1) in the set of track representations 320 for the track 310 are updated using the foreground blobs from the association hypothesis selected at step 720. Each track representation is updated, including updating the height, width, location and velocity of the track representation, depending on the event that the track representation is modelling.

Figure 8:
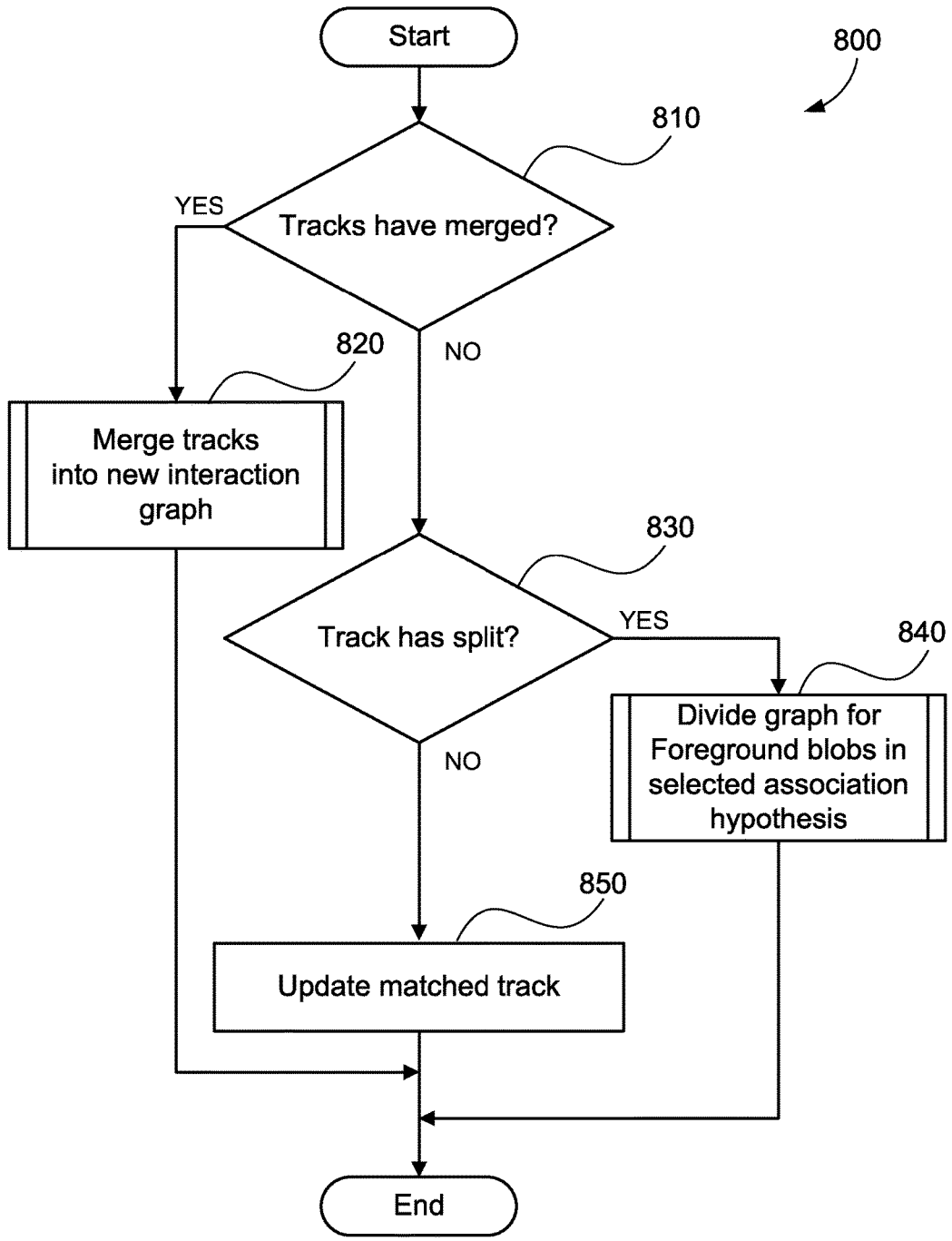
FIG. 8 is a schematic flow diagram showing a method of associating one or more tracks and one or more blobs in an association hypothesis as used in the method of FIG. 7.

A method 800 of associating one or more tracks and one or more blobs, as executed at step 730, will be described in detail below with reference to FIG. 8.

Then at marking step 740, the processor 105 marks the association hypothesis selected at step 720 as processed.

At update step 760, the processor 105 updates each track representation 350-1 for each track 310 that has not been matched to one or more of the foreground blobs 240 (i.e., the track 310 is not in one of the association hypotheses in the non-contradictory set of association hypotheses generated at step 560). The predicted states of the track representations for an unmatched track, as predicted at step 410, becomes the new state for the corresponding track representation.

At create step 770, the processor 105 creates a new track 310 for each foreground blob that has not been matched to a track 310 (i.e., the foreground blob is not in one of the association hypotheses in the non-contradictory set of association hypotheses). The new track created for an unmatched foreground blob initially has one track representation in the set of track representations 320 (i.e., the "normal" track representation), which models an unoccluded track moving through the scene.

The method 800 of associating one or more tracks and one or more blobs in an association hypothesis, as executed in step 730, will now be described in detail with reference to FIG. 8. The method 800 may be implemented as software resident within the storage module 109 of the camera 100 and being controlled in its execution by the processor 105 of the camera 100.

The method 800 begins at decision step 810, where the processor 105 determines if tracks 310 in the association hypothesis selected at step 720 have merged. In one arrangement, the processor 105 determines that tracks have merged if the association hypothesis selected at step 560 contains more than one track. If tracks have merged then the method 800 continues to merge step 820. Otherwise, the method 800 continues to decision step 830.

At merge step 820, the processor 105 creates a new graph based on the foreground blob in the association hypothesis selected at step 720 by merging the tracks in the selected association hypothesis.

To merge the tracks at step 820, a new active track is created to be the root node of a new graph. As described above, a graph is a hierarchical structure of nodes where each node represents a track. The new active track actively tracks the merged objects corresponding to the merged tracks until the merged objects split, leave the scene, or merge with other object(s). If the processor 105 determines that each merging track should be added to the new graph, then the merging tracks are each added as a corresponding child of the root node in the new graph. If one of the merging tracks to be added to the new graph was the root node of a further graph, then the hierarchy in the further graph is maintained when the merging track is added to the new graph. Each merging graph added to the new graph becomes a sub-graph of the new graph. A method 900 of merging graphs to create a new graph, as executed at step 820, will be described in detail below with reference to FIG. 9. After step 820 the method 800 concludes.

At decision step 830, the processor 105 performs the detection of a split. It is determined at step 830 if a track 310 in the association hypothesis has split. If the track 310 in the association hypothesis has matched two or more foreground blobs (e.g., the foreground blobs may be fragments), then the track 310 may have split. A split in the track 310 occurs due to a split between the objects associated with the track 310. As described above, the track 310 is represented by a node in a graph structure which may be the new graph created at step 820.

In one arrangement, the processor 105 determines if the track 310 has split based on an area sparseness ratio. For example, the area of the bounding boxes of each foreground blob fragment are summed, and the summed area are compared to the area of the bounding box surrounding all the fragments. If the ratio is less than a given value (e.g., 0.66) (i.e., the fragments are sufficiently sparse), then the processor 105 determines that the track 310 has split. If the ratio is equal to or greater than the given value, then the fragments are not sparse and the track 310 has not split. In the case where the fragments are not sparse and the track 310 has not split, the method 800 determines that a detection error has caused fragmentation.

In another arrangement, the processor 105 monitors the movement of each fragment over time. If the monitored fragments exhibit independent motion or motion that is inconsistent with each other, (e.g., the fragments move apart), then the track is determined to have split.

In another arrangement, the processor 105 may consider the graph comprising the track 310 to determine if the track 310 has split. If it is likely that inactive tracks in the graph correspond to any fragments (e.g. inactive tracks in the graph have a sufficiently good similarity score with fragments), then the track is determined to have split.

If the method 800 determines that the track 310 has split at step 830, then the method 800 continues to divide step 840. Otherwise, the method 800 continues to update step 850.

At divide step 840, the processor 105 divides the graph for the foreground blobs 240 in the selected association hypothesis in response to detecting the split of the track 310. As the track 310 is determined to have split at step 830, the corresponding graph, whose root node represents the split track, becomes n graphs, where n is the number of foreground blobs 240 in the selected association hypothesis. The division of the graph is not dependent upon m merged tracks splitting into m split tracks. For example, four merged tracks may split into two foreground blobs 240. A method 1000, as executed at step 840, of dividing graphs for a given set of foreground blobs 240 to create new graphs will be described in detail below with reference to FIG. 10. After step 840, the method 800 concludes.

At update step 850, the processor 105 updates all track representations 350-1 for the track 310 in the selected association hypothesis based on the foreground blobs 240 in the association hypothesis. The processor 105 also detects events which may be affecting the detection of the object being tracked by the track 310, such as occlusion of the object by one or more background objects (or background clutter) or fragmentation/splitting. One or more new track representations that model the detected event are also created and stored at step 850. If a previously detected event has ended, for example, the object being tracked has been detected as having moved beyond the detected location of the occlusion of the object by one or more background objects; or the object has been confirmed as having split into two objects; or the detection of the object is no longer fragmented, then the corresponding track representations that modelled that event are deleted from the set of track representations 320 associated with the object. Each track representation (e.g., 350-1) in the set of track representations 320 for the track 310 being updated is then updated using the foreground blobs from the association hypothesis selected at step 720. The track representations 320 are updated, including updating the height, width, location and velocity of the track representation 320, depending on the event that a particular track representation is modelling. After step 850 the method 800 concludes.

Each track representation (e.g., 350-1) in the set 320 of track representations for the track 310 in the selected association hypothesis is updated according to the behaviour of the event that each track representation is modelling. The matched foreground blobs are used as the basis for updating each track representation. In particular, the state of the "normal" track representation for the track 310 is updated by applying a set of gain values to the differences between the predicted state of the "normal" track representation and the actual state of the detected foreground blobs. A gain value is a fraction between "0" and "1", where a value of "0" causes the new state of the "normal" track representation to be the predicted state. A value of "1" causes the new state of the "normal" track representation to be the detected state of the foreground blobs. The updated value for the state value X is determined in accordance with Equation (3), as follows:

$$X = gain_X(X_{detected\_state} - X_{predicted\_state}) + X_{predicted\_state},$$
$$0 \geq gain_X \leq 1 \quad (3)$$

where $gain_X$ is the gain value for the state value X, $X_{detected\_state}$ is the detected state for the state value X, and $X_{predicted\_state}$ is the predicted state for the state value X.

In one arrangement, each value (e.g., height, width, x location, y location) in the state has a different gain value. In one arrangement, the gain values are determined using a Kalman filter. In another arrangement, the gain values are supplied as inputs to an Alpha Beta filter.

The track representation associated with the occlusion of the track by background clutter is updated using a set of gain values in a similar manner to the "normal" track representation described above. However, the values (height, width, location) from the foreground blobs are not directly used to update the state values of the occlusion track representation. The height and width of the occlusion track representation are kept consistent with the height and width of the normal representation prior to the occlusion of the object occurring. The location of the occlusion track representation is determined by observing the location of the unoccluded edges of the detection, and then using the height and/or width of the occlusion track representation to approximate the location.

Figure 9:
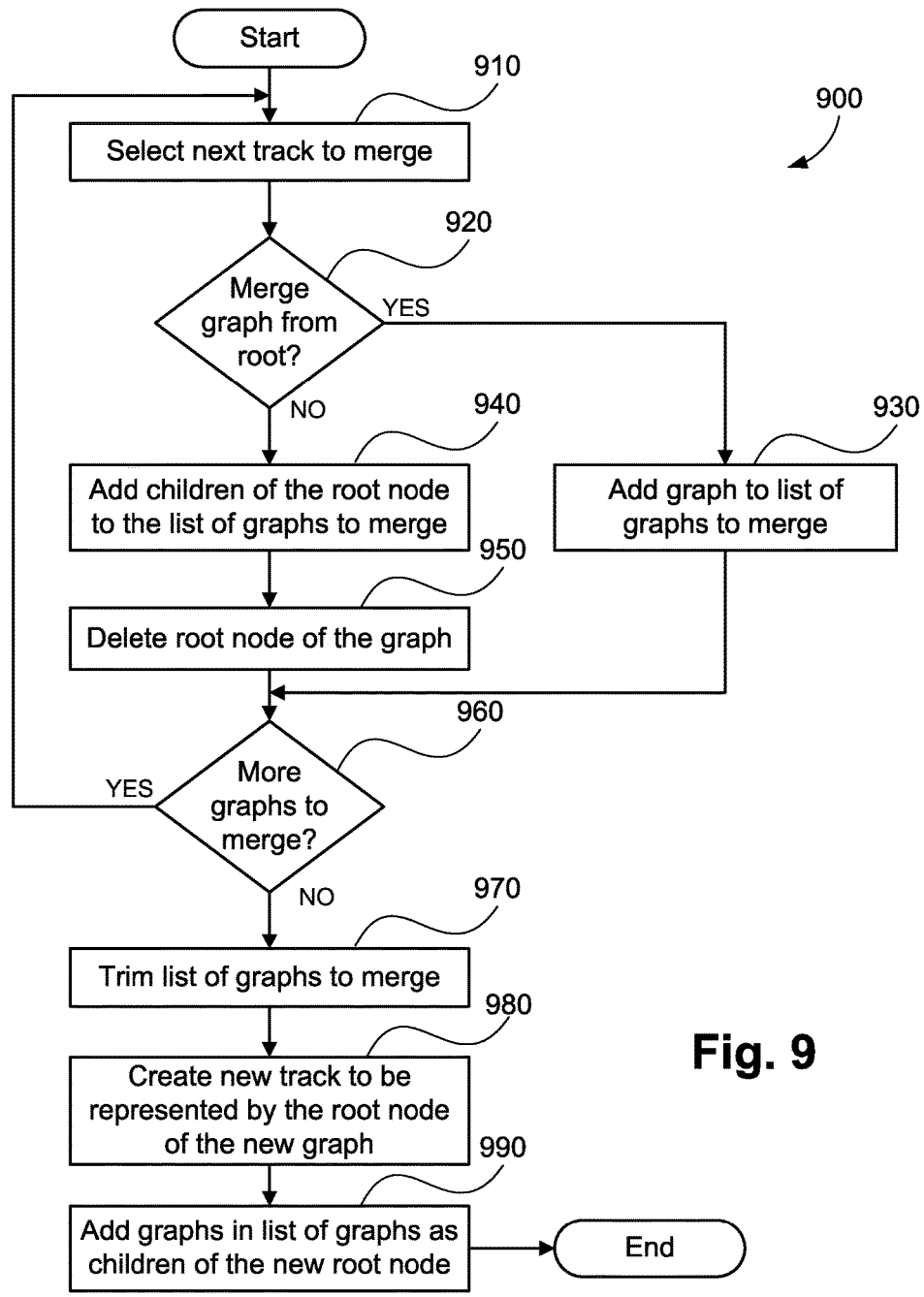
FIG. 9 is a schematic flow diagram showing a method of merging tracks to create a new graph as used in the method of FIG. 8.

A method 900 of merging tracks to create a new graph, as executed at step 820, will be described in detail with reference to FIG. 9. The method 900 may be implemented as software resident within the storage module 109 of the camera 100 and being controlled in its execution by the processor 105 of the camera 100.

The method 900 begins at selection step 910. At selection step 910, the processor 105 selects the next track to be merged from a given list of tracks, such as a list of tracks in the association hypothesis selected at step 720. The next track to be merged is represented by a graph (or sub-graph). The root node of the graph (or sub-graph) represents the next track selected to be merged.

Then at decision step 920, if the processor 105 determines that the graph representing the track to be merged ("the merging graph") should be merged from the root node of the graph, then the method 900 proceeds to add root node step 930. Otherwise, the method 900 proceeds directly to step 940. If the root node of the merging graph is unlikely to be seen again, for example, the root node was created due to a recent (e.g., within the last 0.75 seconds) merge, then the merging graph is not merged from the root node. If the root node of the merging graph was recently created (e.g. the root node is a track created within the last 0.5 seconds), or is deemed likely to be noise, then the merging graph will not be merged form the root node. By not merging graphs from the root node in certain circumstances, such as when the graph may be noise, new graphs created due to merges have a lower depth and are less complicated.

At add root node step 930, the processor 105 adds the root node of the merging graph to a list of graphs to merge. The list of graphs may be configured, for example, within memory 170. The method 900 then proceeds to decision step 960.

At step 940, the processor 105 adds the children of the root node of the merging graph to the list of graphs to merge. If the root node of the merging graph did not have any children, then no graphs are added to the list of graphs to merge. If the root node of the merging graph did have children, then effectively all the sub-graphs corresponding to each child of the root node will be merged.

After step 940, the method 900 continues to delete step 950. At delete step 950, the processor 105 deletes the only root node of the merging graph. Other nodes in the merging graph apart from the root node are not deleted. The method 900 then proceeds to decision step 960.

At decision step 960, the processor 105 determines if there are more tracks to be merged in the given list of tracks. If there are more tracks to be merged, then the method 900 returns to selection step 910. Otherwise, the method 900 proceeds to trim step 970.

At trim step 970, the processor 105 determines if there are too many graphs to merge in the list of graphs populated in steps 930 and 940. The list of graphs to merge has a maximum allowable amount of graphs in the list of graphs to merge (e.g., eight (8) graphs). If there are more than the maximum amount of graphs in the list of graphs to merge, then graphs will be removed from the list of graphs to merge until the number of graphs in the list of graphs to merge is less than or equal to the maximum amount. In one arrangement, the graphs removed from the list of graphs to merge are the graphs with the smallest root node by area of the bounding box.

Then at create step 980, the processor 105 creates a new active track, which is represented by the root node of the new graph. In creating the new active track, the processor 105 also performs the step of creating a new node representing the new active track. The new active track corresponds to the merged objects and tracks the merged objects in subsequent frames until the merged objects leave the scene, split, or merge with other objects.

Then at add children step 990, the processor 105 performs the step of adding the graphs (or graph structures), in the list of graphs to merge, as children nodes of the new root node to create a new merged graph structure. The track that is represented by the root node of the merging graphs will no longer be active (i.e., the track will now be set to inactive). The state of the inactive track corresponds to the state of the tracked object prior to the merge.

In another arrangement, the processor 105 may limit the depth of the new graph (e.g, to four (4) layers). Nodes in the graph that are in layers that are beyond the maximum depth may be deleted.

Figure 10:
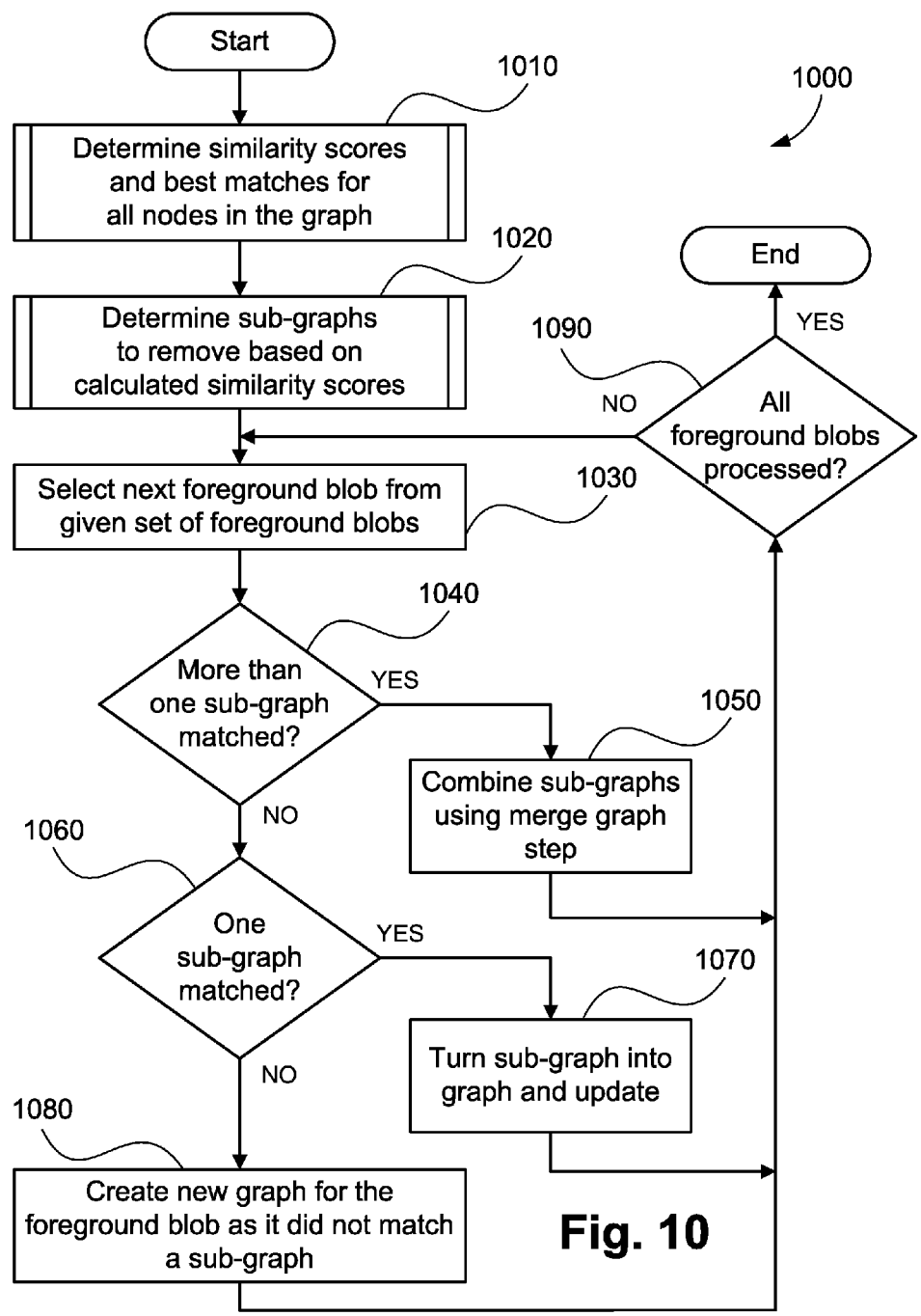
FIG. 10 is a schematic flow diagram showing a method of dividing graphs for a given set of foreground blobs to create new graphs as used in the method of FIG. 8.

A method 1000 of dividing graphs for a set of foreground blobs to create new graphs, as executed at step 840, will be described in detail with reference to FIG. 10. The set of foreground blobs may be the foreground blobs in the association hypothesis selected at step 720. The method 1000 may be implemented as software resident within the storage module 109 of the camera 100 and being controlled in its execution by the processor 105 of the camera 100.

The method 1000 begins at determine step 1010. At determine step 1010, the processor 105 performs the step of determining a similarity score between each node in a graph and each foreground blob in the set of foreground blobs (foreground areas) corresponding to the split objects from the merged objects. The graph may represent one or more tracks in the association hypothesis selected at step 720. A foreground blob having the best similarity score in the graph is determined for each node. The sub-graph corresponding to the determined foreground blob is determined to be a sub-graph to be removed from the graph. In one arrangement, the best similarity score and corresponding foreground blob for each node in the graph is stored within RAM 170. In another arrangement, the corresponding foreground blob and a binary flag indicating if the node has a better similarity score than all descendants of a particular node is stored. A method 1100 of determining similarity scores and corresponding foreground blob matches for all the nodes in a graph, as executed at step 1010, will be described in detail below with reference to FIG. 11. After determine step 1010, the method 1000 proceeds to step 1020.

At determine step 1020, the processor 105 determines which sub-graphs should be removed from the graph to be split. In one arrangement, the sub-graphs to be removed are determined based on the similarity scores to the corresponding split foreground blob determined in step 1010. In another arrangement, the sub-graphs to be removed are determined based on the binary flags indicating if each node has a better similarity score than all of the descendant nodes of the particular node. The remaining nodes in the graph (i.e., any node that is not in one of the sub-graphs to be removed) will be deleted. Each sub-graph to be removed will have a corresponding foreground blob which may have been generated by the split of the merged objects. More than one sub-graph to be removed may be associated with the same corresponding foreground blob. Also, a foreground blob may not have a corresponding removed sub-graph. A method 1200 of determining which sub-graphs should be removed from the graph to be split, as executed at step 1020, will be described in detail below with reference to FIG. 12. After step 1020 the method 1000 proceeds to step 1030.

At selection step 1030, the processor 105 selects the next foreground blob in a given set of foreground blobs for the association hypothesis selected at step 720.

Then at decision step 1040, the processor 105 determines if the foreground blob that was selected at step 1030 has more than one corresponding sub-graph to be removed, as determined in step 1020. If the selected foreground blob has two or more corresponding sub-graphs to be removed, then the method 1000 proceeds to combine step 1050. Otherwise, the method 1000 proceeds to decision step 1060.

At combine step 1050, the processor 105 combines all of the sub-graphs that correspond to the foreground blob selected at step 1030 into one graph. The sub-graphs are combined using the same method 900 used to merge graphs as described above with reference to FIG. 9. The root node of the new graph is now used to track the merged objects, based on the corresponding foreground blob. The method 1000 then proceeds to decision step 1090.

In the case of a foreground blob having two or more corresponding removed sub-graphs, the foreground blob is considered to have two or more tracks from different parts of the original graph. For example, person A and person B may merge. In the new graph, the track for person A and track for person B will be represented by children nodes of a new track represented by the root node for the graph for person A+B. Later, person A+B may merge with person C, resulting in a new graph that has three (3) layers. The root node of the new graph will be a track for person A+B+C. In the present example, the root node of the new graph has children of person C and person A+B. Person A+B in turn has children of person A and person B. Continuing the example, the graph may split into two foreground blobs, a first foreground blob containing person A, and a second foreground blob containing person B+C. Allowing the combination of the sub-graph for person B to correspond to the second blob and the sub-graph for person C to correspond to the second foreground blob allows the objects to be correctly tracked.

At decision step 1060, the processor 105 determines if the foreground blob that was selected at step 1030 has exactly one corresponding sub-graph, as determined in step 1020. If the selected foreground blob has exactly one corresponding sub-graph, then the method 1000 proceeds to update step 1070. Otherwise, the method 1000 proceeds to create step 1080.

At update step 1070, the processor 105 first turns the sub-graph corresponding to the foreground blob that was selected at step 1030 into a new graph by setting the root node of the sub-graph to be an active track. Also at step 1070, the processor 105 updates the root node of the graph using the foreground blob selected at step 1030. In one arrangement, the update of the track using the foreground blob sets the state of the track to be the same as the foreground blob. In another arrangement, the state of the track is a combination of the prediction for the track into the current time and the foreground blob. In another arrangement, the state of the track depends upon the amount of time that the track has been merged. The method 1000 then proceeds to decision step 1090.

At create step 1080, the processor 105 performs the step of creating a new graph based on the foreground blob selected in step 1030, as the foreground blob does not have a corresponding sub-graph removed in step 1020. The new graph consists of just a root node representing a new track. The new track may be used for tracking the foreground blob (or object(s) associated with the foreground blob) in subsequent frames. The method 1000 then proceeds to decision step 1090. Further new graphs may be created at a further iteration of step 1080 for other foreground blobs that do not correspond to a sub-graph and associated node removed in step 1020.

Allowing a foreground blob not to correspond to a removed sub-graph allows situations to be processed where an object, or a group of merged objects, can add a previously unseen object to the scene. For example, a person in a group of people (e.g. person A+B) leaves behind a bag.

At decision step 1090, the processor 105 determines if there are remaining foreground blobs in the set of foreground blobs. If there are remaining foreground blobs, then the method 1000 returns to selection step 1030. Otherwise, the method 1000 concludes.

Figure 11:
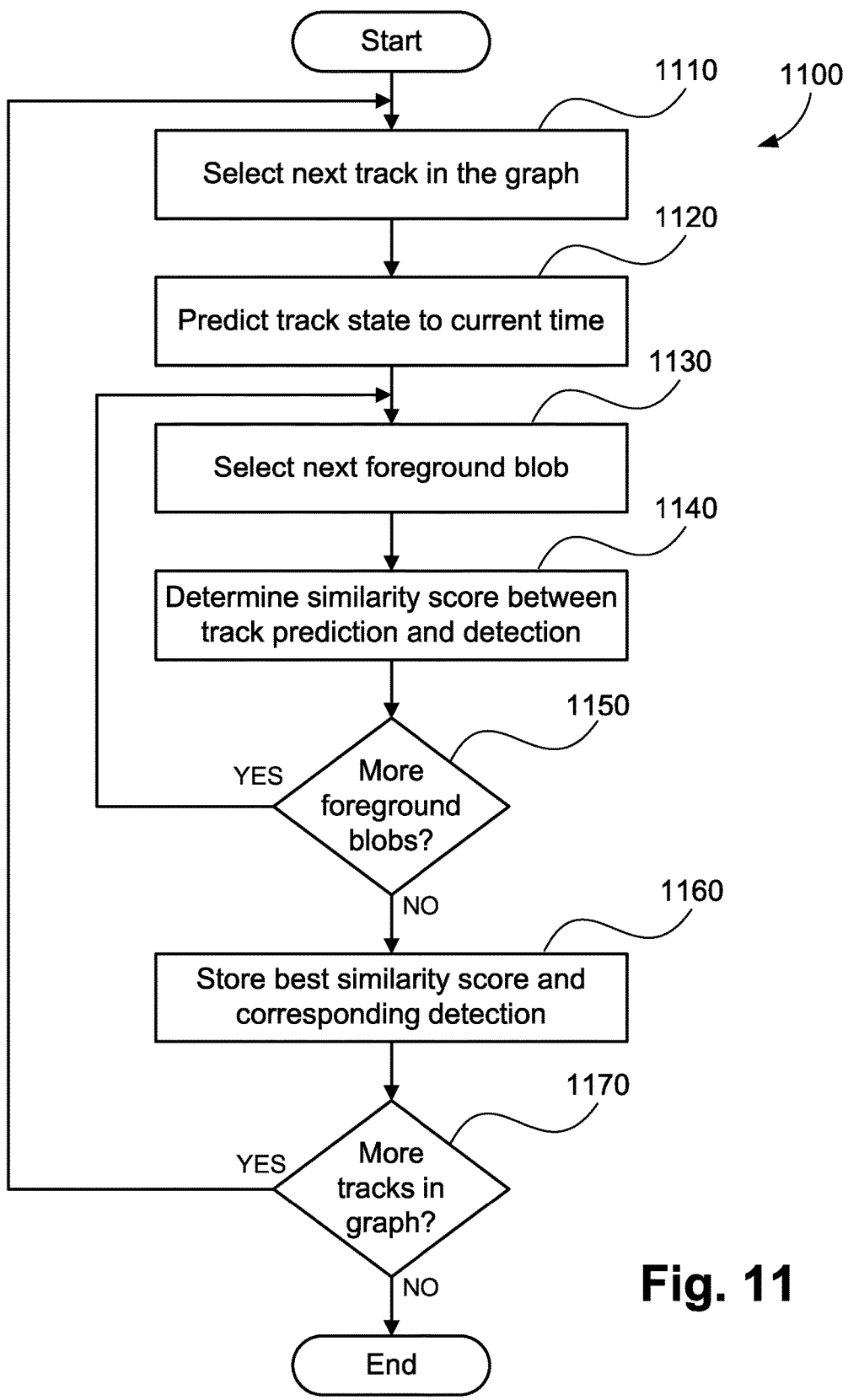
FIG. 11 is a schematic flow diagram showing a method of calculating similarity scores and corresponding foreground blob matches for all the nodes in a graph as used in the method of FIG. 10.

A method 1100 of determining similarity scores to match foreground blobs with each of the nodes in a graph, as executed at step 1010, will be described in detail with reference to FIG. 11. The method 1100 may be implemented as software resident within the storage module 109 of the camera 100 and being controlled in its execution by the processor 105 of the camera 100.

The method 1100 begins at selection step 1110. At selection step 1110, the processor 105 selects a track in the graph. As described above, a track is represented by a node of the graph. In one arrangement, a track in the graph may be selected using an iterative depth-first traversal technique. On each iteration, the depth-first traversal either steps into a next child node, or moves up to the parent node if all of the children nodes have been stepped into. The first track in such a depth-first traversal is the root node of the graph. The depth-first traversal is complete after all of the children nodes of the root node have been stepped into, and the traversal attempts to move to the non-existent parent node of the root node. Using such a method of depth-first traversal of the graph a stack or recursion is avoided. If each child node of the graph has a back pointer 360 to a corresponding parent node of the graph, then all the state information required to be maintained is the current depth, and an array indexed by the current depth indicating the current child node stepped into of the node at the corresponding depth. After the selection step 1110, the method 1100 proceeds to step 1120.

At prediction step 1120, the processor 105 predicts the state of the track selected at step 1110 at the current time. For example, the location of an object being tracked by the track may be predicted based on the motion of the track prior to the track merging. In one arrangement, the height and width of the track may be assumed to be constant (i.e., the height and the width of the track may be predicted to be the same as the height and the width of the track were prior to the merge). In another arrangement, the height and the width of the track may be adjusted for changes in perspective based on a change in location of the object corresponding to the track. In another arrangement, a visual appearance of the object being tracked may be included and predicted. The prediction of the visual appearance is the same as the visual appearance of the track prior to the merge. After prediction step 1120, the method 1100 proceeds to step 1130.

At selection step 1130, the processor 105 selects a foreground blob in the set of foreground blobs that was accessed in the method 1000.

Then at determine step 1140, the processor 105 determines a similarity score between the prediction for the track predicted at step 1120 and the foreground blob selected at step 1130. The similarity score may be determined in a similar method used to determine the previously described similarity score, sim, as described in detail above. In another arrangement, the similarity score may be based on the similarity between edges of the bounding boxes of the predicted track and the selected foreground blob. In another arrangement, the similarity score may be the overlap of the bounding boxes of the predicted track and the selected foreground blob. In another arrangement, the similarity score may include the difference in visual appearance between the predicted track and the selected foreground blob. After calculate step 1140, the method 1100 proceeds to step 1150.

At decision step 1150, the processor 105 determines if there are remaining foreground blobs to be compared to the track selected at selection step 1110. If there are remaining foreground blobs to be compared to the selected track, then the method 1100 returns to selection step 1130. Otherwise, the method 1100 proceeds to step 1160.

At store step 1160, the processor 105 stores the best similarity score for the track selected at selection step 1120, and stores the corresponding foreground blob which has the best similarity score of the set of foreground blobs. The determined similarity score may be used for selecting one of the nodes in the graph structure comprising the track selected at step 1110. The selected node is associated with the corresponding foreground blob. The best similarity score and corresponding foreground blob may be stored in the RAM 170.

In another arrangement, the processor 105 stores a binary flag that indicates if a track represented by a node is better than tracks represented by descendant nodes instead of storing the best similarity score. A "set" flag may be used to indicate that the track represented by one node has a better similarity score than tracks represented by descendant nodes. A "cleared" flag indicates that a track represented by one node has a track represented by a descendent node with a better similarity score. When the best similarity score is found for a selected track, the corresponding binary flag for the selected track is set. The flags corresponding to ancestor nodes of a node representing the selected track are individually cleared by comparing the best similarity score for the track selected by the selection step 1110 against the best similarity score for each ancestor of the selected track. If the selected track has a better score than a track represented by a given ancestor node, then the corresponding flag for the track represented by that ancestor node is cleared to indicate that the track represented by the ancestor node has a descendent with a better similarity score.

Tracks represented by nodes that do not have any descendant nodes (i.e., leaf nodes of the graph), have a corresponding flag left set, as conceptually the tracks represented by nodes without descendant nodes have a better similarity score than the set of zero descendant nodes. One method of storing similarity scores for ancestor nodes is to store an array of similarity scores within RAM 170, indexed by depth. The similarity score for a selected track may be added to the array at the current depth, and compared against each previous similarity score in the array. After store step 1160, the method 1100 proceeds to step 1170.

At decision step 1170, the processor 105 determines if the depth-first traversal of the graph has been completed (i.e., if there are remaining tracks in the graph to be processed). If there are remaining tracks in the graph, then the method 1100 returns to step 1110. Otherwise, the method 1100 concludes.

Figure 12:
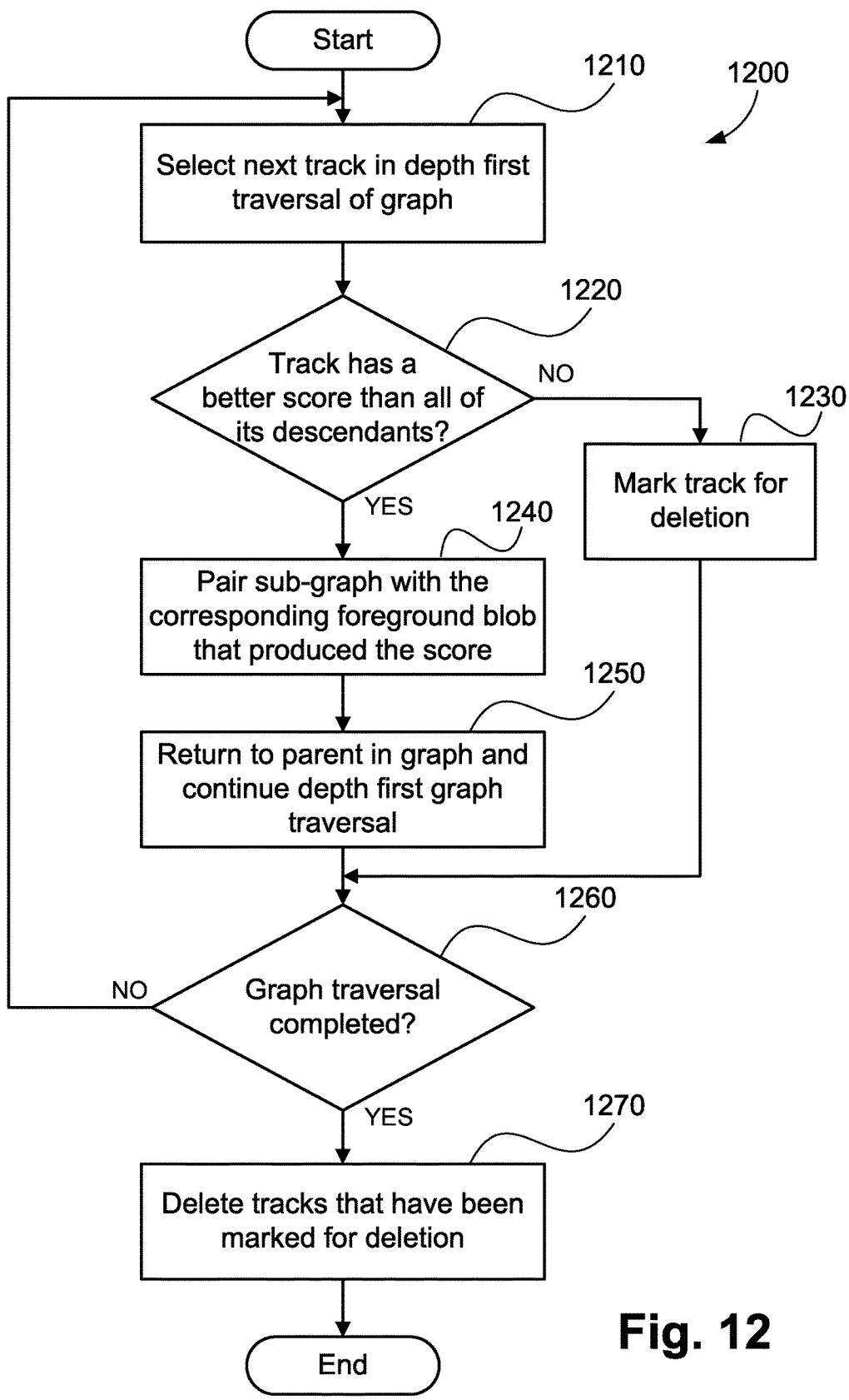
FIG. 12 is a schematic flow diagram showing a method of determining which sub-graphs should be removed from the graph to be split as used in the method of FIG. 10.

A method 1200 of determining which sub-graphs should be removed from the graph to be split, as executed at step 1020, will be described in detail with reference to FIG. 12. The method 1200 may be implemented as software resident within the storage module 109 of the camera 100 and being controlled in its execution by the processor 105 of the camera 100.

The method 1200 begins at selection step 1210. At selection step 1210, the processor 105 selects a track in the iterative depth-first traversal of the graph. On each iteration, the depth-first traversal either steps into the next child node of the graph represented the next track, or moves up to the parent node if all of the children nodes have been stepped into. In one arrangement, the first track in the depth-first traversal will be represented by the root node of the graph.

In another arrangement, the root node of the graph may not be included in the traversal of the graph. In such an arrangement, the root node of the graph cannot be removed from the graph and thus will be deleted. The depth-first traversal is complete after all of the children nodes of the root node have been stepped into, and the traversal attempts to move to the parent node of the root node. If each child node has a back pointer 360 to the parent node, then all the state information required to be maintained is the current depth, and an array indexed by the current depth indicating the current child node stepped into of the node at the corresponding depth. After the selection step 1210, the method 1200 proceeds to step 1220.

At decision step 1220, the processor 105 determines if the track selected at step 1210 has a better similarity score to a split foreground blob. If the track selected at step 1210 has a better similarity score to the target split foreground blob than the similarity scores of other tracks represented by descendant nodes of the selected track, the method proceeds to step 1240. Otherwise, the method proceeds to step 1240. In one arrangement, the processor 105 determines if the corresponding flag is set or cleared. If the flag is set, then the method 1200 proceeds to step 1240. Otherwise, the method 1200 proceeds to step 1230.

At marking step 1230, the processor 105 marks the selected track for deletion, as the selected track does not have a best similarity score compared to the descendant nodes. Tracks marked for deletion will not be in a sub-graph to be removed from the graph being divided. After marking step 1230 the method 1200 proceeds to step 1260.

At pairing step 1240, the processor 105 pairs the selected track (and, by inference, the sub-graph that the selected track is the root node of) with the target foreground blob that resulted in the best similarity score. The track selected at selection step 1210 is now a corresponding track for the target foreground blob that resulted in the best similarity score for the selected track.

At step 1250, the depth-first traversal of the graph returns to parent node of the track selected at selection step 1210. Thus, the children nodes (if there any) of the node representing the selected track will not be considered as part of the depth-first traversal, as the children nodes of the node representing the track do not have a better similarity score than the selected track. The method 1200 may be considered analogous to a greedy algorithm, whereby the best sub-graphs are iteratively removed from the graph.

Then at decision step 1260, the processor 105 determines if the depth-first traversal of the graph has been completed (i.e., if there are remaining tracks to be processed in the graph). If there are remaining tracks in the graph, then the method 1200 returns to step 1210 for the next track. Otherwise, the method 1200 proceeds to step 1270.

At deletion step 1270, the processor 105 deletes all nodes representing the tracks that were marked for deletion at marking step 1230. In another arrangement, nodes representing the tracks marked for deletion may be removed from the graph and deleted during the depth-first traversal of the graph. After deletion step 1270 the method 1200 concludes.

The methods described above will now be further described by way of example with reference to FIGS. 13A to 13F and 14A to 14F.

FIGS. 13A to 13F show a sequence of images that show three people in a scene and their corresponding tracks 1300, 1310 and 1340 interacting.

Figure 13A:
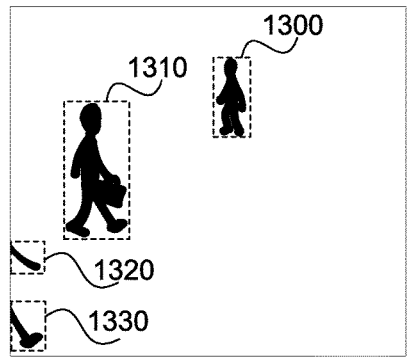
FIGS. 13A to 13F show an example of a sequence of images that show three people and corresponding tracks interacting.

In FIG. 13A, there is a first track 1300 corresponding to a first person as one foreground blob, a second track 1310 corresponding to a second person as one foreground blob and a third track 1320 and a fourth track 1330 both corresponding to a third person.

Figure 13B:
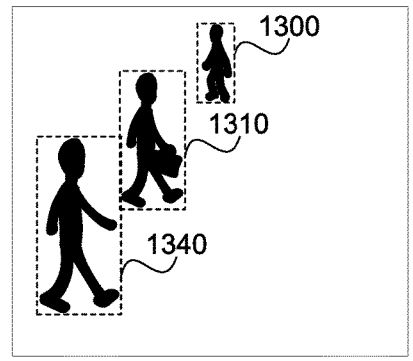

In FIG. 13B, tracks 1320 and 1330 corresponding to the third person have merged, and are now tracked by track 1340 as one foreground blob. As seen in FIG. 13B, the third person was initially detected as two foreground blobs corresponding to the tracks 1320 and 1330, and now the third person has been detected as one foreground blob represented by track 1340. There is no knowledge of the correspondence of each track (e.g., 1320) to a real-world object. For example, there is no concept that track 1320 was part of a real-world object, and that track 1340 corresponds to one real-world object.

Figure 13C:
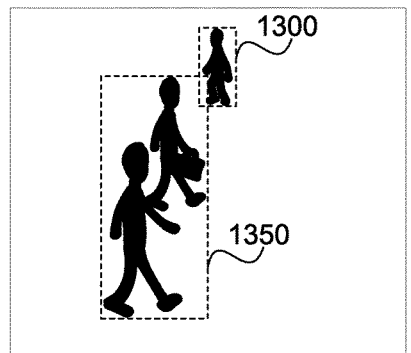

In FIG. 13C, track 1310, corresponding to the second person, and track 1340, corresponding to the third person, have merged, and are now track 1350 as one foreground blob.

Figure 13D:
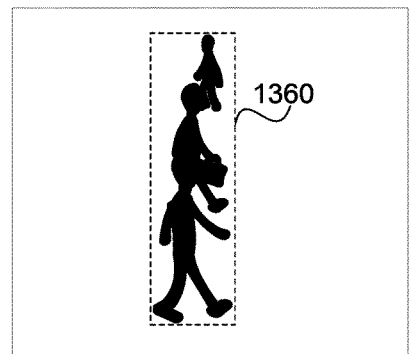

In FIG. 13D, track 1300, corresponding to the first person, and track 1350, corresponding to the merged second person and third person, have merged, and are now track 1360 as one foreground blob. Track 1360 is now tracking the blob corresponding to the merged first, second and third person.

Figure 13E:
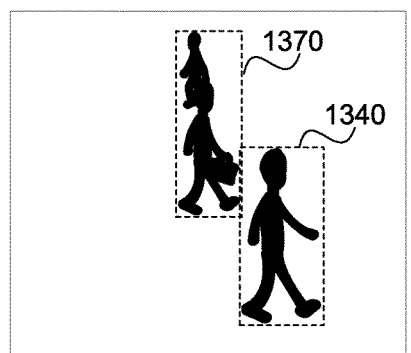

In FIG. 13E, track 1360 has split into two foreground blobs with one foreground blob containing the first and second person corresponding to track 1370, and another foreground blob containing the third person corresponding to track 1340. In response to the split, a graph corresponding to the track 1360 has been divided. Track 1340, corresponding to the third person, has been recovered. Track 1300, corresponding to the first person, and track 1310, corresponding to the second person, have been merged together to form track 1370 as one foreground blob.

Figure 13F:
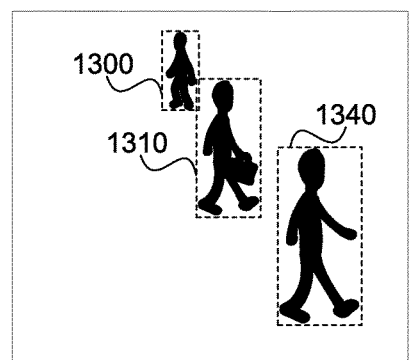

In FIG. 13F, track 1370 has split into two foreground blobs. One foreground blob contains the first person corresponding to track 1300 and another foreground blob contains the second person corresponding to track 1310. In response to the split, a graph corresponding to the track 1370 has been divided. Track 1300, corresponding to the first person, and track 1310, corresponding to the second person have both been recovered.

In one arrangement, each active track is given a unique identifier. The root node of the graph representing the active track may use the same unique identifier as one of the merging tracks. For example, the root node of the graph may use the same unique identifier as the largest merging track. In another arrangement, all tracks (both active and inactive) may have a unique identifier.

FIGS. 14A to 14F show the graphs for the corresponding frames as shown in FIGS. 13A to 13F. The location of a graph as shown in FIGS. 14A to 14F has no relation to the physical location of a corresponding object in the scene. For example, the location of track 1310 in FIG. 14A has no relation to the physical location of the corresponding second person in FIG. 13A. Each active track has been given a unique identifier that is a number. For example, track 1300 corresponding to the first person has been given the identifier "9". The asterisk (*) next to the track identifier indicates an active track (i.e., the track 1300 is the root node of a graph).

In FIG. 14A, there are four tracks 1300, 1310, 1320 and 1330 shown. Each of the tracks can be considered as node of a graph. The track 1310 in FIG. 13A, which corresponds to the second person, has been assigned unique identifier 13*. The track 1300 in FIG. 13A, which corresponds to the first person, has been assigned unique identifier 9*. Track 1320 in FIG. 13A, which corresponds to the third person, has been assigned unique identifier 17*. Track 1330 in FIG. 13A, which also corresponds to the third person, has been assigned unique identifier 18*.

In FIG. 14B, track 1320 and track 1330 from FIG. 14A have merged to form track 1340 which is assigned the identifier 18*, as at step 820 of the method 800 and step 980 of the method 900. Track 1340 in FIG. 13B corresponds to the third person. Track 1340 is the root node of graph 1390 that contains tracks 1340, 1320 and 1330. Track 1340 has two children nodes representing track 1320 which is the first child of track 1340 and track 1330 which is the second child of track 1340. The active track 1330 now tracks the third person, where previously track 1320 and track 1330 had tracked part of the third person.

In FIG. 14C, track 1340 from FIG. 14B, corresponding to the third person, and track 1310 from FIG. 14B, corresponding to the second person, have merged to form track 1350 which is assigned identifier 18*, as at a second iteration of step 820 of the method 800 and step 980 of the method 900. The track 1350 is now tracking the merged second person and third person and is assigned the identifier 18*. As seen in FIG. 14C, the graph 1390 with the root node representing track 1340 from FIG. 14B, corresponding to the third person, is now a child of new root node representing track 1350 in new merged graph 1391. The hierarchy of the nodes of the graph 1390 under the new root node of the merged graph 1391 is maintained in the new graph 1390, as the node representing the track 1340 still has children nodes representing the tracks 1320 and 1330.

In FIG. 14D, track 1300 from FIG. 14C, corresponding to the first person, and track 1350 from FIG. 14C, corresponding to the merged second person and third person, have merged to form new graph 1392 including track 1360 which is assigned identifier 18*, as at a second iteration of step 820 of the method 800 and step 980 of the method 900. The hierarchy of the previous graph 1391 that track 1350 from FIG. 14C was the root node of can be seen to be maintained.

In FIG. 14E, the graph 1392 from FIG. 14D having track 1360 as the root node has been divided. In the example of FIG. 14D, track 1310 in the third layer identified by the identifier 13 in the graph 1392 had the best similarity score to a foreground blob corresponding to track 1370, of the descendants of the track 1350, and track 1310 does not have any descendants. Therefore, track 1310 is removed first as at step 1270 of the method 1200. Track 1350 in the second layer in FIG. 14D, for example, has the next best score. However, track 1310 has already been removed and track 1310 is track 1360, track 1350 cannot now be removed from the graph 1392 and track 1350 should be deleted. If track 1340 in the third layer, identified by identifier 18 in the graph 1392 in FIG. 14D, had the best similarity score to a foreground blob corresponding to track 1340, then track 1340 is removed with descendant tracks 1320 and 1330 of the track 1340. The remaining track 1300 in the graph has the best similarity score to the foreground blob corresponding to the track 1370 compared to the foreground blob corresponding to the track 1340. Therefore the track 1300 can now be removed as at step 1270. As track 1300 and track 1310 are associated with the same foreground blob, then the tracks 1300 and 1310 are merged to form graph 1393 having track 1370 identified by identifier 13* as the root node of the graph 1393. Thus, track 1340 corresponding to the third person may be correctly recovered in a timely manner, whilst the merged first person and second person are tracked by track 1370 having identifier 13*.

In FIG. 14F, the graph 1393 from FIG. 14E that track 1370 is the root node of is divided so that track 1310, corresponding to the first person, and track 1300, corresponding to the second person, are recovered as at step 1270.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claim(s) defining the invention are as follows:

1. A method of tracking objects of a scene, the method comprising:
    determining two or more tracks which have merged, each track being associated with at least one of the objects and having a corresponding graph structure, each graph structure comprising at least one node representing the corresponding track;
    creating a new node representing the merged tracks;
    adding the graph structures as children nodes of the new node to create a merged graph structure;
    detecting a split between the objects associated with one of the tracks represented by the nodes of the merged graph structure;
    determining similarity between one or more of the nodes in the merged graph structure and foreground areas corresponding to split objects;
    selecting one of the one or more nodes in the merged graph structure based on the determined similarity; and
    dividing the merged graph structure and creating a new graph structure for tracking the objects in response to the detection of the split, the new graph structure being created from the merged graph structure based on the determined similarity, wherein the new graph structure has the selected node at the root of the new graph structure such that the selected node is distinct or separate from any preceding or prior node,
    wherein the creation of the new graph structure removes and/or does not have a requirement or condition on having a 1:1 correlation between merged tracks and split tracks, and
    wherein the new graph structure is monitored, maintained and/or updated by an object tracker, a video object tracker or a processor to track the objects of the scene or the objects in a sequence of images of the scene.

2. The method according to claim 1, wherein hierarchy of the nodes under the selected node is maintained in the new graph structure.

3. The method according to claim 1, further comprising merging graph structures corresponding to the tracks associated with the split.

4. The method according to claim 1, further comprising creating further new graph structures for tracks that do not correspond to one of the at least one node or to any node.

5. The method according to claim 1, wherein the selected node has a highest or best similarity score as compared with a similarity score of one or more unselected nodes.

6. The method according to claim 1, wherein the selected node is removed from the merged graph structure along with a hierarchy underneath, or descendant node(s) of, the selected node.

7. The method according to claim 6, wherein one or more ancestors of the selected node are marked for deletion and can no longer be selected.

8. The method according to claim 7, wherein the nodes divide iteratively until no nodes are left or until the nodes are marked for deletion.

9. The method according to claim 1, wherein the determined similarity is measured with at least one of:
    (i) a gating distance used by at least one of: an Alpha Beta Filter based video object tracker, a Kalman Filter based video object tracker, a multi-state Alpha Beta Filter based video object tracker which approximates a Kalman filter with a predetermined number of states before reaching a Cramer-Rao lower bound;
    (ii) a fraction representing an area of overlap divided by a total area occupied by an extended spatial representation of the foreground areas and a spatial prediction of a selected graph structure or track representation; and
    (iii) a sum of discrepancies of edge positions for edges of the merged graph structure.

10. The method according to claim 9, wherein the determining of the similarity step further comprises applying one or more bonuses or one or more penalties to determine the similarity, wherein the one or more bonuses encourage association hypotheses.

11. The method according to claim 1, further comprising comparing the determined similarity to a threshold value; and
    if the determined similarity is less than the threshold value, creating an additional association hypothesis, representing a hypothesis that a combination of selected foreground areas match a selected graph structure or track representation, and adding the additional association hypothesis to a list of one or more association hypotheses, or
    if the determined similarity is more than or equal to the threshold value, determining whether all combinations of the foreground areas are processed.

12. The method according to claim 11, further comprising using the list of one or more association hypotheses to reduce the list to a non-contradictory set of association hypotheses.

13. The method according to claim 12, further comprising:
    when an unprocessed association hypothesis remains, selecting an unprocessed association hypothesis from the list, associating track(s) and foreground area(s) in the selected association hypothesis and marking the association hypothesis as processed; and
    when no unprocessed association hypothesis remains, updating each track that has not been matched to one or more of the foreground areas and creating a new graph structure for each foreground area that has not been matched to a track.

14. The method according to claim 1, wherein at least one of:
    (i) the creation of the new graph structure does not require, or does not have, a number, m, of merged tracks being split into the number, m, of split tracks, and
    (ii) the removal and/or lack of the requirement or condition on having a 1:1 correlation between the merged tracks and the split tracks allows for at least one of: one or more real-time decisions to be made when one or more splits are detected, and one or more complex interactions to be accepted by a video object tracker without needing to either label the tracks as fragments, objects or groups or without making assumptions on how many real-world objects are present in an interaction.

15. The method according to claim 1, wherein at least one of:

(i) the new graph structure is used to update or track the scene;
(ii) the new graph structure is displayed in a graph;
(iii) the graph of the new graph structure is maintained or updated by the object tracker, the video object tracker or the processor to track the objects; and
(iv) the new graph structure is stored in a memory.

16. A system for tracking objects of a scene, the system comprising:
   a memory for storing data and a computer program;
   a processor coupled to the memory for executing the computer program, the computer program comprising instructions for:
      determining two or more tracks which have merged, each track being associated with at least one of the objects and having a corresponding graph structure, each graph structure comprising at least one node representing the corresponding track;
      creating a new node representing the merged tracks;
      adding the graph structures as children nodes of the new node to create a merged graph structure;
      detecting a split between the objects associated with one of the tracks represented by the nodes of the merged graph structure;
      determining similarity between one or more of the nodes in the merged graph structure and foreground areas corresponding to split objects;
      selecting one of the nodes in the merged graph structure based on the determined similarity; and
      dividing the merged graph structure and creating a new graph structure for tracking the objects in response to the detection of the split, the new graph structure being created from the merged graph structure based on the determined similarity, wherein the new graph structure has the selected node at the root of the new graph structure such that the selected node is distinct or separate from any preceding or prior node,
      wherein the creation of the new graph structure removes and/or does not have a requirement or condition on having a 1:1 correlation between merged tracks and split tracks, and
      wherein the new graph structure is monitored, maintained and/or updated by an object tracker, a video object tracker or the processor to track the objects of the scene or the objects in a sequence of images of the scene.

17. The system according to claim 16, wherein at least one of:
   (i) the creation of the new graph structure does not require, or does not have, a number, m, of merged tracks being split into the number, m, of split tracks, and
   (ii) the removal and/or lack of the requirement or condition on having a 1:1 correlation between the merged tracks and the split tracks allows for at least one of: one or more real-time decisions to be made when one or more splits are detected, and one or more complex interactions to be accepted by a video object tracker without needing to either label the tracks as fragments, objects or groups or without making assumptions on how many real-world objects are present in an interaction.

18. The system according to claim 16, wherein at least one of:
   (i) the new graph structure is used to update or track the scene;
   (ii) the new graph structure is displayed in a graph;
   (iii) the graph of the new graph structure is maintained or updated by the object tracker, the video object tracker or the processor to track the objects; and
   (iv) the new graph structure is stored in a memory.

19. An apparatus for tracking objects of a scene, the apparatus comprising:
   at least one processor that operates to:
      determine two or more tracks which have merged, each track being associated with at least one of the objects and having a corresponding graph structure, each graph structure comprising at least one node representing the corresponding track;
      create a new node representing the merged tracks;
      add the graph structures as children nodes of the new node to create a merged graph structure;
      detect a split between the objects associated with one of the tracks represented by the nodes of the merged graph structure;
      determine similarity between one or more of the nodes in the merged graph structure and foreground areas corresponding to split objects;
      select one of the nodes in the merged graph structure based on the determined similarity; and
      divide the merged graph structure and create a new graph structure for tracking the objects in response to the detection of the split, the new graph structure being created from the merged graph structure based on the determined similarity, wherein the new graph structure has the selected node at the root of the new graph structure such that the selected node is distinct or separate from any preceding or prior node,
      wherein the creation of the new graph structure removes and/or does not have a requirement or condition on having a 1:1 correlation between merged tracks and split tracks, and
      wherein the new graph structure is monitored, maintained and/or updated by an object tracker of the apparatus, a video object tracker of the apparatus or the at least one processor to track the objects of the scene or the objects in a sequence of images of the scene.

20. The apparatus according to claim 19, wherein at least one of:
   (i) the creation of the new graph structure does not require, or does not have, a number, m, of merged tracks being split into the number, m, of split tracks, and
   (ii) the removal and/or lack of the requirement or condition on having a 1:1 correlation between the merged tracks and the split tracks allows for at least one of: one or more real-time decisions to be made when one or more splits are detected, and one or more complex interactions to be accepted by a video object tracker without needing to either label the tracks as fragments, objects or groups or without making assumptions on how many real-world objects are present in an interaction.

21. The apparatus according to claim 19, wherein at least one of:
   (i) the new graph structure is used to update or track the scene;
   (ii) the new graph structure is displayed in a graph;
   (iii) the graph of the new graph structure is maintained or updated by the object tracker, the video object tracker or the at least one processor to track the objects; and
   (iv) the new graph structure is stored in a memory.

22. A non-transitory computer readable medium having a computer program stored thereon for causing a processor to execute a method for tracking objects of a scene, the method comprising:
- determining two or more tracks which have merged, each track being associated with at least one of the objects and having a corresponding graph structure, each graph structure comprising at least one node representing the corresponding track;
- creating a new node representing the merged tracks;
- adding the graph structures as children nodes of the new node to create a merged graph structure;
- detecting a split between the objects associated with one of the tracks represented by the nodes of the merged graph structure;
- determining similarity between one or more of the nodes in the merged graph structure and foreground areas corresponding to split objects;
- selecting one of the nodes in the merged graph structure based on the determined similarity; and
- dividing the merged graph structure and creating a new graph structure for tracking the objects in response to the detection of the split, the new graph structure being created from the merged graph structure based on the determined similarity, wherein the new graph structure has the selected node at the root of the new graph structure such that the selected node is distinct or separate from any preceding or prior node,
- wherein the creation of the new graph structure removes and/or does not have a requirement or condition on having a 1:1 correlation between merged tracks and split tracks, and
- wherein the new graph structure is monitored, maintained and/or updated by an object tracker, a video object tracker or the processor to track the objects of the scene or the objects in a sequence of images of the scene.

23. The non-transitory computer readable medium according to claim 22, wherein at least one of:
(i) the creation of the new graph structure does not require, or does not have, a number, m, of merged tracks being split into the number, m, of split tracks, and
(ii) the removal and/or lack of the dependency on having a 1:1 correlation between the merged tracks and the split tracks allows for at least one of: one or more real-time decisions to be made when one or more splits are detected, and one or more complex interactions to be accepted by a video object tracker without needing to either label the tracks as fragments, objects or groups or without making assumptions on how many real-world objects are present in an interaction.

24. The non-transitory computer readable medium according to claim 22, wherein at least one of:
(i) the new graph structure is used to update or track the scene;
(ii) the new graph structure is displayed in a graph;
(iii) the graph of the new graph structure is maintained or updated by the object tracker, the video object tracker or the processor to track the objects; and
(iv) the new graph structure is stored in a memory.

* * * * *